US007575270B2

(12) United States Patent
Nagai et al.

(10) Patent No.: US 7,575,270 B2
(45) Date of Patent: Aug. 18, 2009

(54) OPENING/CLOSING APPARATUS FOR VEHICLE

(75) Inventors: Kei Nagai, Kiryu (JP); Mitsuhiro Okada, Kiryu (JP)

(73) Assignee: Mitsuba Corporation, Kiryu-shi, Gunma (JP)

( * ) Notice: Subject to any disclaimer, the term of this patent is extended or adjusted under 35 U.S.C. 154(b) by 0 days.

(21) Appl. No.: 12/257,523

(22) Filed: Oct. 24, 2008

(65) Prior Publication Data

US 2009/0107048 A1 Apr. 30, 2009

(30) Foreign Application Priority Data

Oct. 26, 2007 (JP) ............................. 2007-279563
Jul. 2, 2008 (JP) ............................. 2008-173493

(51) Int. Cl.
*B60J 5/04* (2006.01)
*E05F 15/10* (2006.01)

(52) U.S. Cl. .................. 296/155; 296/146.4; 74/89.22; 49/281

(58) Field of Classification Search .............. 296/146.1, 296/155, 146.4, 146.9; 74/425, 89.2, 89.22; 49/279, 280, 281; 292/DIG. 23
See application file for complete search history.

(56) References Cited

U.S. PATENT DOCUMENTS 4,907,474 A * 3/1990 Bolger ........................ 475/14
5,316,365 A * 5/1994 Kuhlman et al. ............ 296/155
5,833,301 A * 11/1998 Watanabe et al. ........... 296/155
5,913,563 A * 6/1999 Watanabe et al. ........... 296/155
6,955,389 B2 * 10/2005 Suzuki et al. ............ 296/146.4
7,175,228 B2 * 2/2007 Mrkovic et al. ............. 296/155
2004/0256883 A1 * 12/2004 Ichinose et al. ............. 296/155
2004/0262945 A1 * 12/2004 Suzuki et al. ............... 296/155
2005/0161973 A1 * 7/2005 Yokomori ................... 296/155
2006/0220416 A1 * 10/2006 Mrkovic et al. ............. 296/155

FOREIGN PATENT DOCUMENTS

JP 6-323057 11/1994

* cited by examiner

*Primary Examiner*—Patricia L Engle
(74) *Attorney, Agent, or Firm*—McCormick, Paulding & Huber LLP

(57) ABSTRACT

An opening/closing apparatus for a vehicle, which has a door-lock mechanism, is provided. An output of a motor unit is transmitted to a drum having a planetary gear mechanism, and the slide door of the vehicle is driven by an open-side cable and a close-side cable wound around the drum. A closer cable of the door-lock mechanism is coupled to a carrier of the planetary gear mechanism, and coupled to a latch of the door-lock mechanism via a coupling link. The coupling link is constituted as a toggle mechanism so as to regulate the rotation of the latch by the traction force of the closer cable until the latch is rotated toward a full latch direction from an unlatch position. When the regulation of the latch by the toggle mechanism is released, the latch is rotationally driven toward the full latch direction due to the rotation of the carrier.

26 Claims, 22 Drawing Sheets

OPENING/CLOSING APPARATUS FOR VEHICLE

CROSS-REFERENCE TO RELATED APPLICATIONS

Applicant hereby claims foreign priority benefits under U.S.C. §119 from Japanese Patent Application No. 2007-279563 filed on Oct. 26, 2007 and No. 2008-173493 filed on Jul. 2, 2008, the contents of which are incorporated by reference herein.

TECHNICAL FIELD OF THE INVENTION

The present invention relates to an opening/closing apparatus for vehicle, which opens and closes a slide door provided to a vehicle by power of a drive source.

BACKGROUND OF THE INVENTION

As an opening/closing apparatus for vehicle, which opens and closes a slide door provided to a vehicle-body side portion of the vehicle such as a station wagon or minivan by the power of the drive source, there has been known a cable type apparatus in which a pair of cables located on an open side and a close side are coupled to the slide door from forward and backward directions of the vehicle; and those cables are driven by a drive unit that uses an electric motor or the like as a drive source, whereby the slide door is operated for opening and closing while being towed by the cables.

Meanwhile, a door-lock mechanism is provided in the vehicle to retain the closed slide door at a fully-closed position. In order to lock and unlock the vehicle body and the slide door, the door-lock mechanism is provided with: a striker fixed to one of the vehicle body and the slide door; and a latch provided to the other thereof, wherein the latch is engaged with the striker so as to be turned to a full latch position if the slide door is closed up to the fully-closed position. Further, a ratchet is provided in the door-lock mechanism, and if the latch is rotated up to the full latch position, the ratchet is engaged with the latch, whereby rotation of the latch in an unlatch direction is regulated, and the slide door is retained at the fully-closed position.

Now, when the slide door is fully closed, a door seal member for preventing rainwater from entering into a vehicle compartment in a fully-closed state of the slide door is provided to one of positions where the slide door and the vehicle body are opposed to each other, so that the door seal member is elastically and abutably disposed in the fully-closed state. For this reason, when the slide door is closed up to a half door position and then is being retracted up to the fully-closed position, a force for deforming (or compressing) the seal member is required, so that there is the case where it is difficult to retract the slide door from the half door position to the fully-closed position only by a force generated from the drive unit.

Accordingly, an opening/closing apparatus shown in, for example, Patent Document 1 (Japanese Patent Application Laid-Open Publication No. 6-323057) discloses that a closer mechanism for performing a pulling operation is separately provided in addition to a drive unit for automatically opening and closing a slide door, whereby when the slide door is closed up to a half door position, the closer mechanism causes a latch engaged with a striker to be driven from an unlatch position to a full latch position so as to pull the slide door up to the fully-closed position.

Further, when the closed slide door is automatically opened, it is necessary to release retention of the slide door by the door-lock mechanism, that is, engagement of the ratchet with the latch. For this reason, in the opening/closing apparatus shown in, for example, Patent Document 1, a releaser mechanism for unlocking the door-lock mechanism is separately provided in addition to the drive unit, and when the slide door is automatically opened from the fully-closed position, the releaser mechanism causes a releasing operation to be performed by driving the ratchet from an engaged position to a disengaged position, whereby the retention of the slide door by the door-lock mechanism is automatically released.

Meanwhile, there is also known a vehicle provided with a door-lock mechanism (open-state retention mechanism) for retaining an opened slide door at a predetermined open position. In such a vehicle, for example, when the slide door is opened up to a fully-opened position, an engaged member (hook) is engaged with an engaging member so that the slide door is retained at the fully-opened position.

SUMMARY OF THE INVENTION

However, the opening/closing apparatus shown in Patent Document 1 is provided with the drive source (electric motor) for performing the pulling operation and for unlocking the door-lock mechanism, the drive mechanism, and the like in addition to the drive unit for opening and closing the slide door, so that there are problems of an increase of the number of parts, an increase of their costs, and the like. Further, since volume of the opening/closing apparatus also becomes large, it is difficult to equip the opening/closing apparatus with the vehicle whose body is limited in space, for example, a light car or the like.

An object of the present invention is to provide an opening/closing apparatus for vehicle, which has an operating function of a door-lock mechanism as well as an automatic opening/closing function of a slide door and makes an equipment characteristic with the vehicle body good.

An opening/closing apparatus for vehicle according to the present invention is an apparatus for opening and closing a slide door provided to a vehicle by power of an electric motor, the opening/closing apparatus comprising: a guide rail provided to one of a vehicle body and the slide door; a support arm provided to the other of the vehicle body and the slide door, and movably supported to the guide rail; the electric motor provided with an output shaft rotatable in both forward and backward directions, and disposed in the other of the vehicle body and the slide door; a drive rotating body provided in the other of the vehicle body and the slide door, and rotationally driven by the electric motor; an open-side wire member whose one end is wound around the drive rotating body, and whose other end is coupled to an open-side end of the guide rail via the support arm; a close-side wire member whose one end is wound around the drive rotating body, and whose other end is coupled to a close-side end of the guide rail via the support arm; a speed reducing mechanism having an input gear fixed to the output shaft, an output gear provided to the drive rotating body and rotating together with the drive rotating body, and a switching gear meshing with the input and output gears and rotatably supported to a carrier; a latch provided in the other of the vehicle body and the slide door, and being rotatable between an unlatch position and a full latch position; a striker provided in the one of the vehicle body and the slide door, and engaged with the latch to retain the slide door at a fully-closed position together with the latch; a coupling member for closure coupling the carrier and the latch, and transmitting rotation of the carrier to the latch; and a switching mechanism for regulating rotation of the latch in a full latch direction due to the rotation of the carrier when the latch is at an unlatch position, and for releasing the regulation when the latch is rotated to the full latch direction from the unlatch position, wherein when the slide door is actuated for closure so that the regulation of the rotation of the latch is released by the switching mechanism, the latch is rotationally driven in the full latch direction by the carrier so that the slide door is retracted in a fully-closed position.

An opening/closing apparatus for vehicle according to the present invention is an apparatus for opening and closing a slide door provided to a vehicle by power of an electric motor, the opening/closing apparatus comprising: a guide rail provided to one of a vehicle body and the slide door; a support arm provided to the other of the vehicle body and the slide door, and being movably supported to the guide rail; the electric motor provided with an output shaft rotatable in both forward and backward directions, and disposed in the one of the vehicle body and the slide door; a drive rotating body provided in the one of the vehicle body and the slide door, and rotationally driven by the electric motor; an open-side wire member whose one end is wound around the drive rotating body, and whose other end is coupled to the support arm from an open side extending along the guide rail; a close-side wire member whose one end is wound around the drive rotating body, and whose other end is coupled to the support arm from a close side extending along the guide rail; a speed reducing mechanism having an input gear fixed to the output shaft, an output gear provided in the drive rotating body and rotating together with the drive rotating body, and a switching gear meshing with the input and output gears and rotatably supported to a carrier; a latch provided in the one of the vehicle body and the slide door, and being rotatable between an unlatch position and a full latch position; a striker provided in the other of the vehicle body and the slide door, and engaged with the latch to retain the slide door at a fully-closed position together with the latch; a coupling member for closure coupling the carrier and the latch, and transmitting rotation of the carrier to the latch; and a switching mechanism for regulating rotation of the latch in a full latch direction due to the rotation of the carrier when the latch is at an unlatch position, and for releasing the regulation when the latch is rotated in the full latch position direction from the unlatch position, wherein when the slide door is actuated for closure so that the regulation of the rotation of the latch is released by the switching mechanism, the latch is rotationally driven in the full latch direction by the carrier so that the slide door is retracted in a fully-closed position.

The opening/closing apparatus for vehicle according to the present invention is such that the input gear is a sun gear, the output gear is an internal gear formed integrally with an inner circumferential surface of the drive rotating body formed into a ring shape, and the switching gear is a planetary gear rotatably supported to the carrier by a support shaft parallel to the output shaft so as to mesh with the sun gear and the internal gear.

The opening/closing apparatus for vehicle according to the present invention is such that wherein the input gear is a drive-side bevel gear, the output gear is a driven-side bevel gear fixed to the drive rotating body and opposing axially to the drive-side bevel gear, and the switching gear is a side bevel gear rotatably supported to the carrier by a support shaft orthogonal to the output shaft so as to mesh with the drive-side bevel gear and the driven-side bevel gear.

The opening/closing apparatus for vehicle according to the present invention further comprises a rotating body for closure provided rotatably relatively to the carrier and rotated together with the carrier when the carrier is rotated a predetermined angle from a reference position, wherein the coupling member for closure is coupled to the carrier via the rotating body for closure.

The opening/closing apparatus for vehicle according to the present invention is such that the rotating body for closure is always biased by biasing means in a direction of rotating the latch in the unlatch direction.

The opening/closing apparatus for vehicle according to the present invention further comprises: a ratchet retaining the latch at a full latch position; and an opening-operation releaser member whose one end is coupled to the ratchet and whose other end is engaged with an opening-operation drive portion of the carrier, the opening-operation releaser mechanism being driven by the opening-operation drive portion so as to cause the ratchet to perform a releasing operation when the carrier is rotated due to an operation of the electric motor in an opening direction.

The opening/closing apparatus for vehicle according to the present invention further comprises: an open-state retaining mechanism provided in the other of the vehicle body and the slide door, and engaged with an engagement member provided in the one thereof so as to retain the slide door at a predetermined open position; and a closing-operation releaser member whose one end is coupled to the open-state retaining mechanism and whose other end is engaged with a closing-operation drive portion of the carrier, the closing-operation releaser member being driven by the closing-operation drive portion so as to cause the open-state retaining mechanism to perform a releasing operation when the carrier is rotated due to an operation of the electric motor in a closing direction.

The opening/closing apparatus for vehicle according to the present invention further comprises: an open-state retaining mechanism provided in the one of the vehicle body and the slide door, and engaged with an engagement member provided in the other thereof so as to retain the slide door at a predetermined open position; and a closing-operation releaser member whose one end is coupled to the open-state retaining mechanism and whose other end is engaged with a closing-operation drive portion of the carrier, the closing-operation releaser member being driven by the closing-operation drive portion so as to cause the open-state retaining mechanism to perform a releasing operation when the carrier is rotated due to an operation of the electric motor in a closing direction.

According to the present invention, since the latch is driven from the unlatch position to the full latch position by the electric motor for automatically opening and closing the slide door, the slide door closed up to the half door position can be pulled up to the fully-closed position, so that it is possible to automatically open and close the slide door by the single electric motor to cause the slide door to perform a pulling operation toward the full-close position without providing an independent electric motor as a closer mechanism. Accordingly, it is possible to downsize the opening/closing apparatus for vehicle and to enhance an equipment characteristic with the vehicle body.

Further, according to the present invention, since a planetary gear mechanism provided with the sun gear, the internal gear, and the planetary gear is used as a speed reducing mechanism, it is possible to downsize the speed reducing mechanism to enhance a vehicle-equipped characteristic of the opening/closing apparatus for vehicle.

Further, according to the present invention, since a differential gear mechanism provided with the drive-side bevel gear, the driven-side bevel gear, and the side bevel gear is used as a speed reducing mechanism, it is possible to downsize the speed reducing mechanism to enhance the vehicle-equipped characteristic of the opening/closing apparatus for vehicle.

Further, according to the present invention, when the slide door is driven by the electric motor to be automatically opened from the full-close position, the opening-operation releaser member is driven by the electric motor for automatically opening and closing the slide door so that the ratchet engaged with the latch can be caused to perform automatically a releasing operation. For this reason, without providing, as a releaser mechanism, an independent electric motor, it is possible to automatically open and close the slide door by the single electric motor to cause the ratchet to perform the releasing operation. Accordingly, it is possible to downsize the opening/closing apparatus for vehicle to enhance the equipment characteristic with the vehicle body.

Further, according to the present invention, when the slide door is driven by the electric motor to be automatically closed from the predetermined open position, the closing-operation releaser member is driven by the electric motor for automatically opening and closing the slide door to cause the open-state retaining member to perform the releasing operation. For this reason, without providing, as a releaser mechanism, an independent electric motor, it is possible to automatically open and close the slide door by the single electric motor to be pulled into the fully-closed position and to cause the open-state retaining mechanism to perform the releasing operation. Accordingly, it is possible to downsize the opening/closing apparatus for vehicle to enhance the equipment characteristic with the vehicle body.

DESCRIPTION OF THE PREFERRED EMBODIMENTS

Hereinafter, an embodiment according to the present invention will be detailed with reference to the accompanying drawings.

Figure 1:
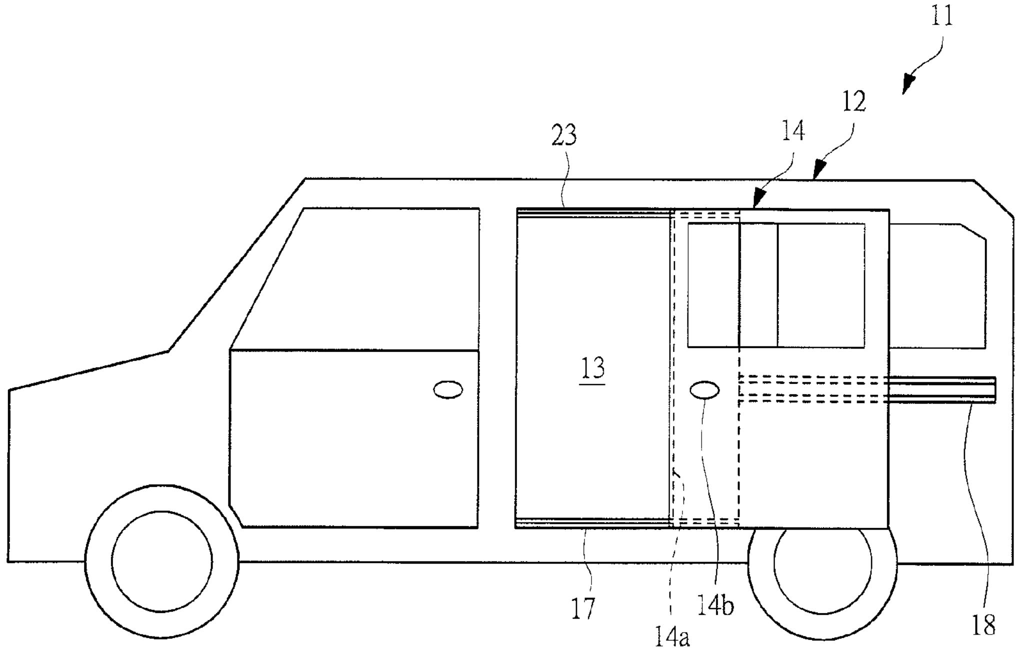
FIG. 1 is a side view of a minivan type vehicle provided with a slide door.

FIG. 1 is a side view of a minivan type vehicle provided with a slide door. A side portion of a vehicle body 12 in a vehicle 11 is provided with a slide door 14 in order to open and close an opening portion 13 for getting on and off a rear seat.

Figure 2:
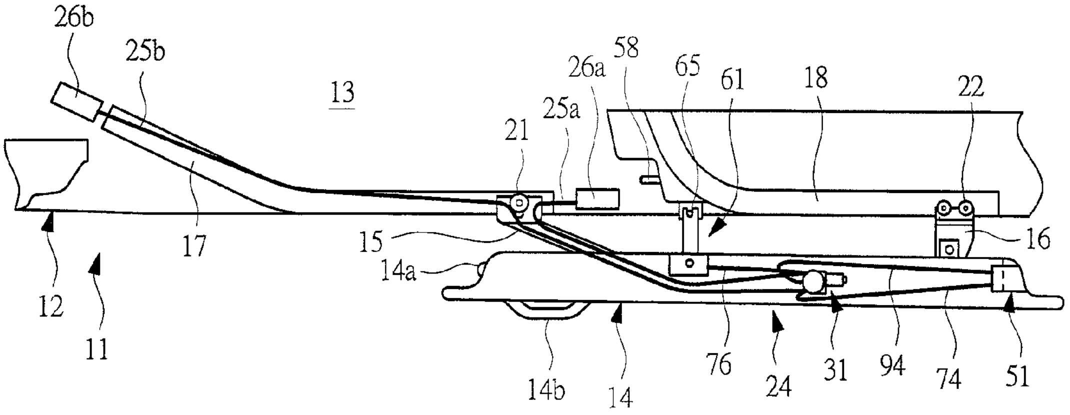
FIG. 2 is a plan view showing an attaching structure of the slide door of FIG. 1 to a vehicle body.

FIG. 2 is a plan view showing an attaching structure of the slide door of FIG. 1 to the vehicle body. A lower arm 15 serving as a support arm is provided to a lower end portion located on a vehicle-front side (close side) of the slide door 14, and a center arm 16 is provided on a vehicle-rear side (open side) of the slide door 14 and to an approximately middle portion in a vehicle-vertical direction. Meanwhile, a lower rail 17 serving as a guide rail is fixed to a lower edge portion of the opening portion 13 of the vehicle body 12, and a center rail 18 is fixed on a vehicle-rear side of the opening portion 13 in the side portion of the vehicle body 12 and to the approximately middle portion in the vehicle-vertical direction. Lower assemblies 21 and 22 are respectively provided at tips of the arms 15 and 16, wherein the lower assembly 21 of the lower arm 15 is movably incorporated in the lower rail 17, and the roller assembly 22 of the center arm 16 is movably incorporated in the center rail 18. Accordingly, the respective arms 15 and 16 are movably supported to the corresponding rails 17 and 18, and the respective arms 15 and 16 move along the corresponding rails 17 and 18, whereby the slide door 14 is opened and closed in a vehicle-longitudinal direction along the side portion of the vehicle body 12 in a sliding manner. Further, the vehicle-front sides of the lower rail 17 and the center rail 18 are bent inside a vehicle compartment, whereby the slide door 14 is retracted inside the vehicle compartment (inside the vehicle body 12) from a position of being pulled outside the vehicle body 12 so as to be closed flush with a side surface of the vehicle body.

Incidentally, the slide door 14 is supported to the vehicle body 12 by a total of three members described below although such a structure is not shown in Figures. That is, an upper arm is provided to an upper end portion on the vehicle-front side of the slide door 14, an upper rail 23 is fixed to an upper edge portion of the opening portion 13 in the vehicle body 12, and a lower assembly (not shown) provided to a tip of the upper arm is movably incorporated in the upper rail 23.

A door seal member 14*a* is provided at a location of the slide door 14 opposing to the vehicle body 12 so as to extend along a vertical direction of a slide-door opening end, and when the slide door 14 is closed up to a fully-closed position, the door seal member 14*a* elastically abuts on the vehicle body 12 to prevent rainwater from entering into the vehicle compartment. The door seal member 14*a* is provided also to other three sides of the slide door 14 although the three door seal members are not shown in Figures, whereby the rainwater is prevented from entering from an entire periphery of the slide door 14. Further, a door handle 14*b* for opening and closing the slide door 14 is provided in an outer surface of the slide door 14.

Figure 3:
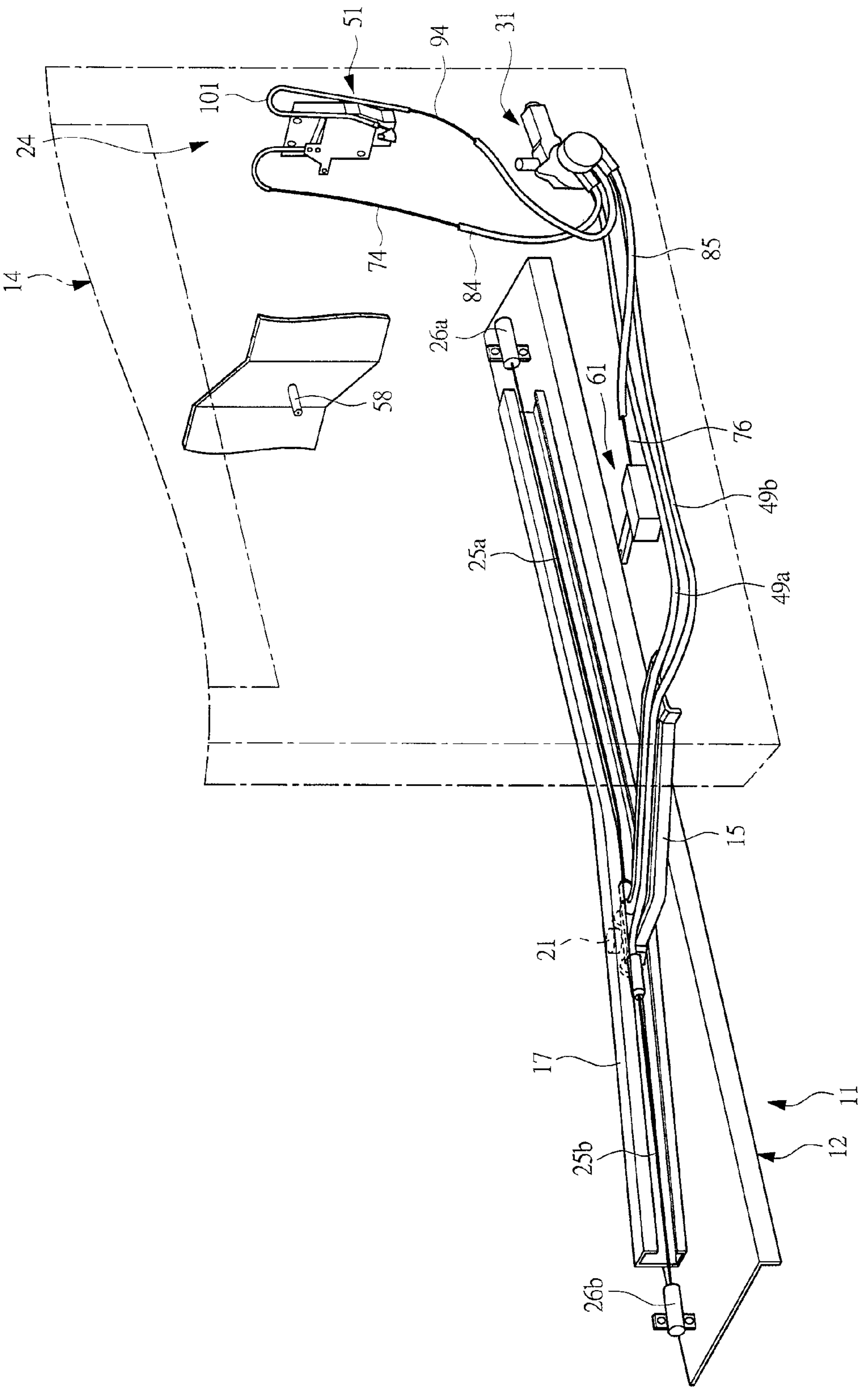
FIG. 3 is a perspective view showing a detail of an opening/closing apparatus for vehicle according to an embodiment of the present invention.

FIG. 3 is a perspective view showing a detail of an opening/closing apparatus for vehicle according to an embodiment of the present invention. An opening/closing apparatus for vehicle 24 (hereinafter "opening/closing apparatus 24") is equipped with the vehicle 11 in order to open and close the slide door 14 by power of a drive source (electric motor).

The opening/closing apparatus 24 is a so-called cable type, and includes an open-side cable 25*a* serving as an open-side wire member and a close-side cable 25*b* serving as a close-side wire member, each of which is laid along the lower rail 17. A coupling unit 26*a* is provided in the vehicle body 12 adjacently to an end portion located on the vehicle-rear side of the lower rail 17. One end of the open-side cable 25*a* is coupled to the coupling unit 26*a*, and the other end thereof is conducted inside the slide door 14 via the lower arm 15. Further, a coupling unit 26*b* is provided in the vehicle body 12 adjacently to an end portion located on the vehicle-front side of the lower rail 17. One end of the close-side cable 25*b* is coupled to the coupling unit 26*b*, and the other end thereof is conducted inside the slide door 14 via the lower arm 15. Namely, one end of the open-side cable 25*a* is coupled to an open-side end (end portion on the vehicle-rear side) of the lower rail 17 via the coupling unit 26*a*, and one end of the close-side cable 25*b* is coupled to a close-side end (end portion on the vehicle-front side) of the lower rail 17 via the coupling unit 26*b*.

Each of the coupling units 26*a* and 26*b* has a function as a tensioner, and predetermined tension is applied to the respective cables 25*a* and 25*b* from the corresponding coupling units 26*a* and 26*b*.

In order to automatically open and close the slide door 14 by driving the open-side cable 25*a* and the close-side cable 25*b*, a drive unit 31 is provided in the opening/closing apparatus 24. In the present embodiment, the drive unit 31 is disposed inside the slide door 14.

Figure 4:
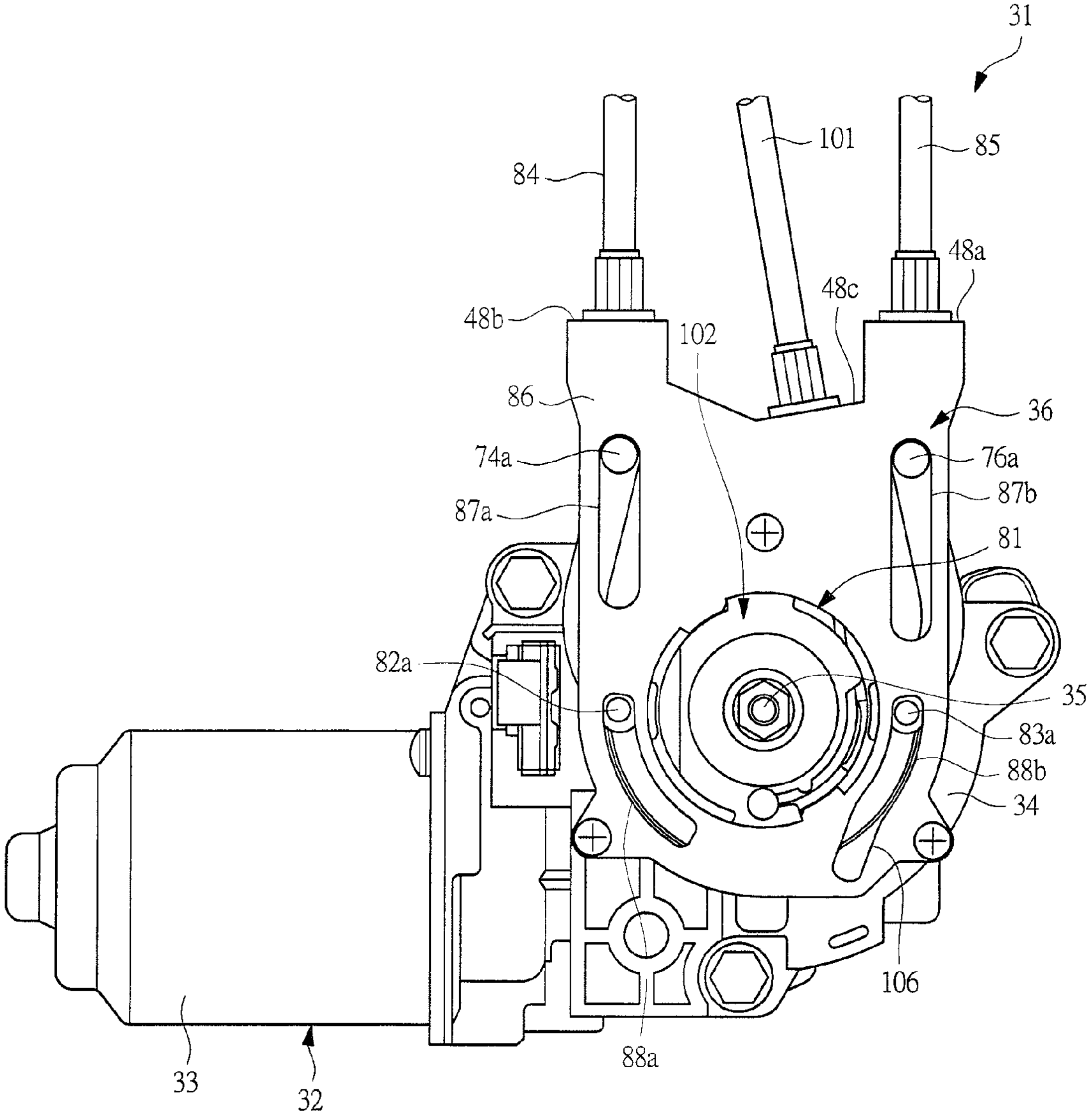
FIG. 4 is a front view showing a detail of a drive unit shown in FIG. 3
Figure 5:
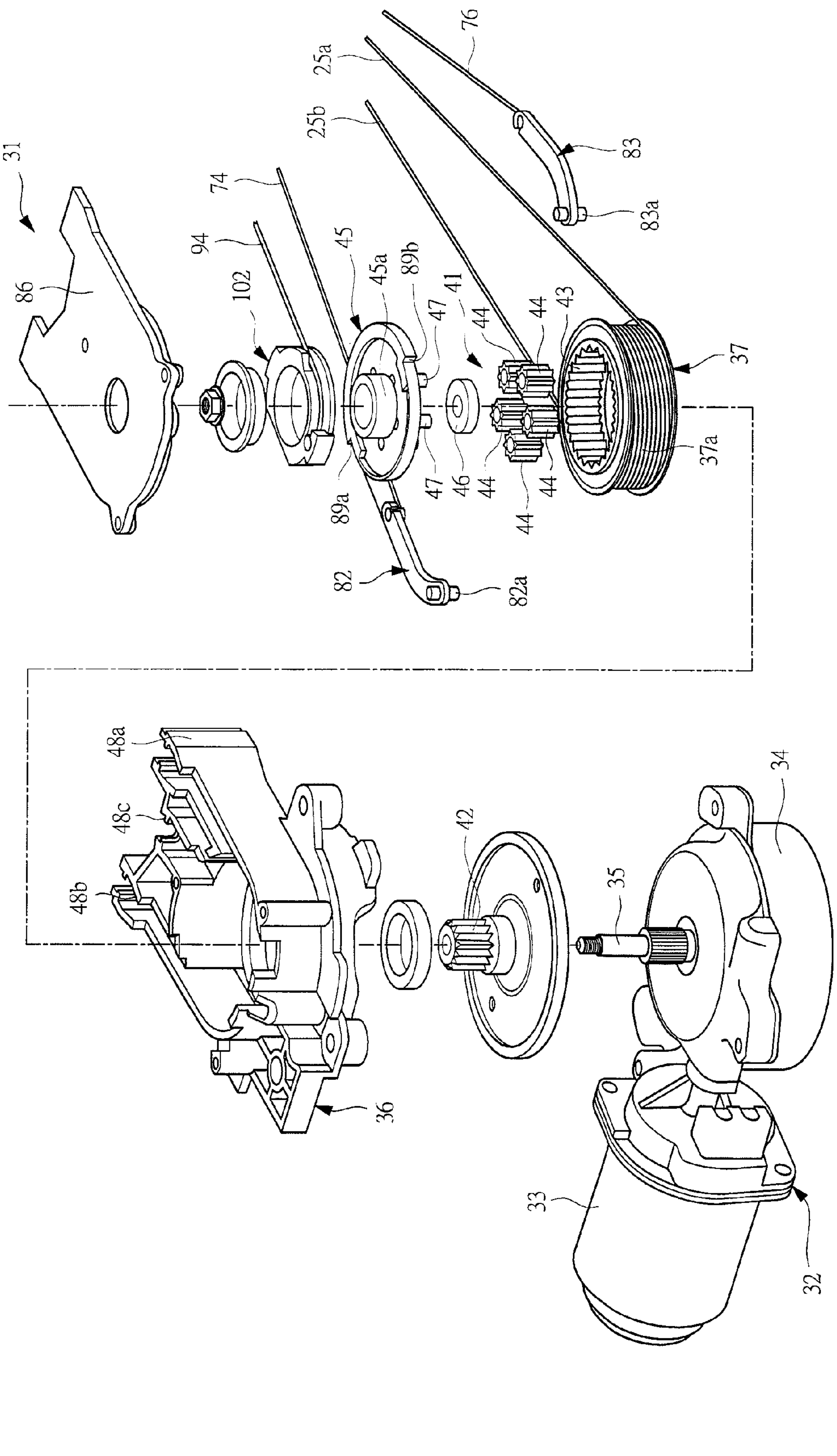
FIG. 5 is an exploded perspective view of the drive unit shown in FIG. 4.
Figure 6:
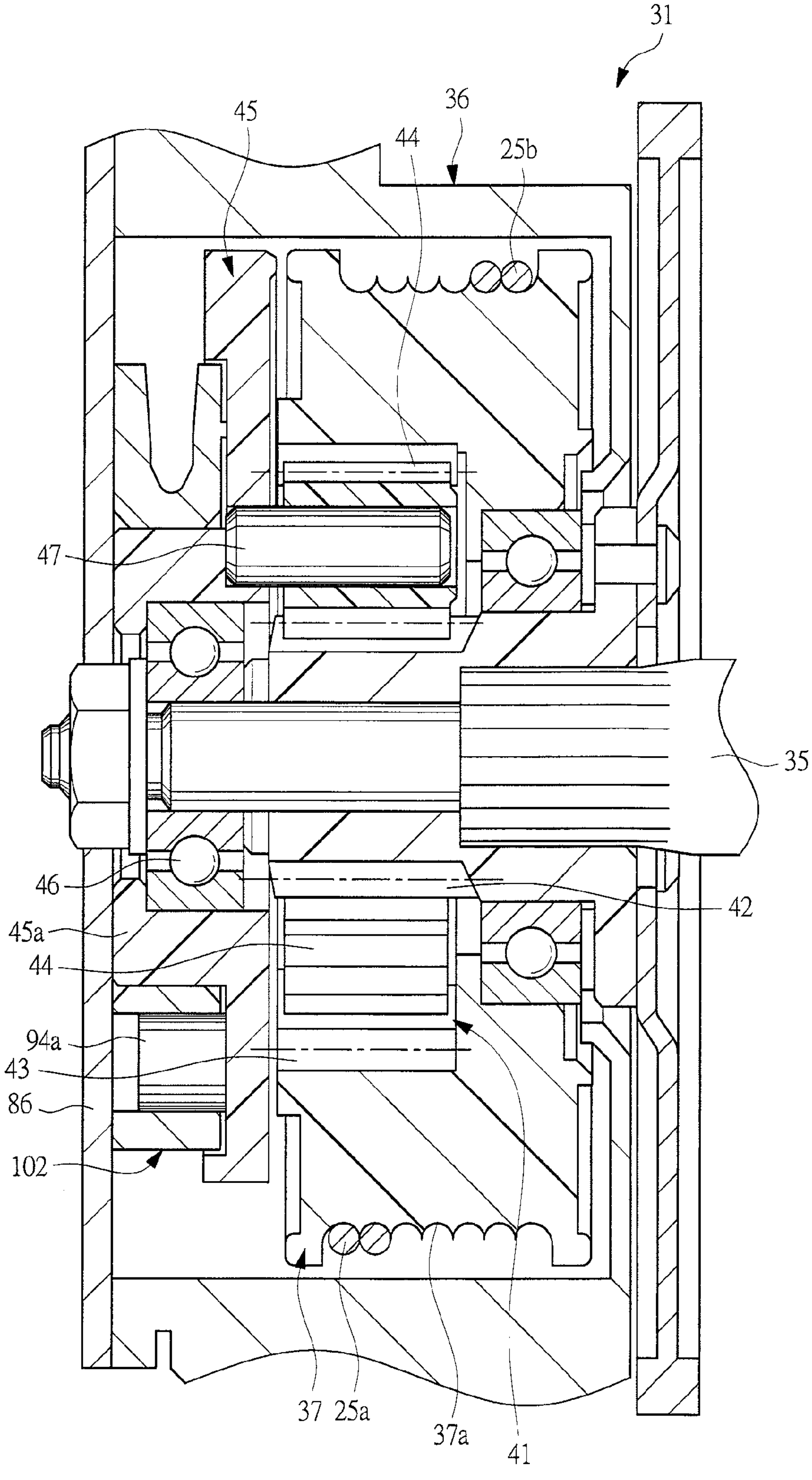
FIG. 6 is a sectional view showing an inner structure of the drive unit shown in FIG. 4.
Figure 7:
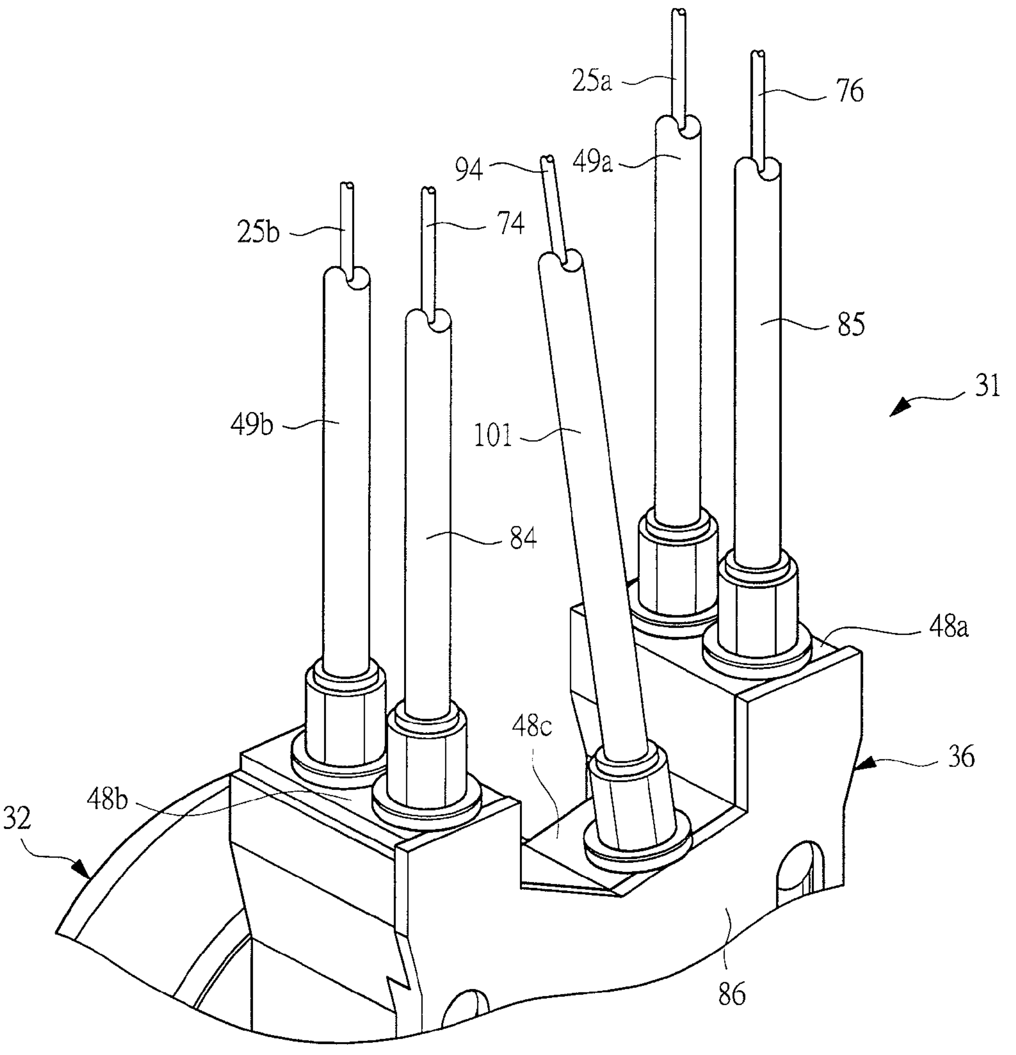
FIG. 7 is a perspective view showing each of cable incoming/outgoing portions of the drive unit shown in FIG. 4.

FIG. 4 is a front view showing a detail of the drive unit shown in FIG. 3; FIG. 5 is an exploded perspective view of the drive unit shown in FIG. 4; FIG. 6 is a sectional view showing an inner structure of the drive unit shown in FIG. 4; and FIG. 7 is a perspective view showing each of cable incoming/outgoing portions of the drive unit shown in FIG. 4.

As shown in FIGS. 4 and 5, the drive unit 31 has a motor with speed reducing gear 32 serving as a drive source. The motor with speed reducing gear 32 has a structure in which a speed reducing gear 34 is attached to an electric motor 33, and rotation of the electric motor 33 is reduced up to predetermined rotating speed by the speed reducing gear 34 and is outputted from the output shaft 35. For example, a motor with brush is used as the electric motor 33, and the output shaft 35 is driven by the electric motor 33 and is intended to be rotatable in both of forward and backward directions. The speed reducing gear 34 has a structure in which a speed reducing mechanism (not shown) such as a worm gear mechanism is accommodated inside a case, and an electromagnetic clutch (not shown) is accommodated inside the case, so that a power transmission path between the electric motor 33 and the output shaft 35 can be connected and disconnected by the electromagnetic clutch.

Incidentally, a control apparatus (not shown) is connected to the motor with speed reducing gear 32, and operations of the electric motor 33 and the electromagnetic clutch are controlled by the control apparatus on the basis of an operation signal of an opening/closing switch (not shown) provided to a door handle 14*b*, a driver seat, a mobile terminal or the like, and on the basis of opening/closing speed of the slide door 14, an opening/closing position thereof, and the like.

A drum case 36 is fixed to the speed reducing gear 34, and a drum 37 serving as a driving/rotating body is rotatably accommodated inside the drum case 36, as shown in FIGS. 5 and 6. The drum 37 is formed into a ring shape (cylindrical shape) by a resin material, and a spiral groove 37*a* is provided in an outer periphery of the drum. Further, an output shaft 35 of the motor with speed reducing gear 32 protrudes inside the drum case 36, and the drum 37 is disposed coaxially with the output shaft 35 so as to be rotatably driven by the motor with speed reducing gear 32.

A planetary gear mechanism 41 serving as a speed reducing mechanism is provided inside the drum 37 in order to transmit the rotation of the output shaft 35 to the drum 37. As shown in FIGS. 5 and 6, the planetary gear mechanism 41 has a sun gear 42 serving as an input gear, an internal gear 43 serving as an output gear, and five planetary gears 44 serving as a switching gear, wherein the sun gear 42 is fixed to the output shaft 35 provided with a serration so as to rotate together with the output shaft 35. The internal gear 43 is formed in an inner circumferential surface of the drum 37 and integrally with the drum 37 so as to be rotated together with the drum 37, whereby the sun gear 42 and the internal gear 43 are coaxially arranged. A carrier 45 is alongside and axially provided inside the drum case 36 so as to be disposed on an opposite side to the speed reducing gear 34 with respect to the drum 37. The carrier 45 is formed into a disk shape and is supported rotatably relatively to the output shaft 35 by a bearing 46. Further, five support shafts 47 evenly spaced in a peripheral direction are provided to the carrier 45 in parallel to the output shaft 35, and the respective planetary gears 44 are rotatably supported to the corresponding support shafts 47 and are arranged between the sun gear 42 and the internal gear 43 so as to mesh with the gears 42 and 43.

As shown in FIG. 7, the drum case 36 is provided with three cable incoming/outgoing portions 48*a*, 48*b* and 48*c*, and the respective cables 25*a* and 25*b* conducted into the slide door 14 via the lower arm 15 are retracted inside the drum case 36 from the corresponding cable incoming/outgoing portions 48*a* and 48*b*. The respective cables 25*a* and 25*b* retracted inside the drum case 36 are wound around the spiral grooves 37*a* of the drums 37 in opposite directions to each other, as shown in FIGS. 5 and 6, and their tips are fixed to the drum 37.

Between the lower arm 15 and each of the cable incoming/outgoing portions 48*a* and 48*b* of the drum case 36, a cover layer of a resin material is provided in an outer periphery of a spring layer which is obtained by winding a rectangular steel wire spirally; flexible outer tubes 49*a* and 49*b* formed so as to be freely curved are provided; and the respective cables 25*a* and 25*b* are accommodated axially movably in the corresponding outer tubes 49*a* and 49*b* so as to move along the outer tubes 49*a* and 49*b*. Incidentally, a liner member (not shown) is arranged in an inner peripheral side of each of the spring layers of the outer tubes 49*a* and 49*b*, thereby being smoothly slid with each of the cables 25*a* and 25*b*.

Figure 8B:
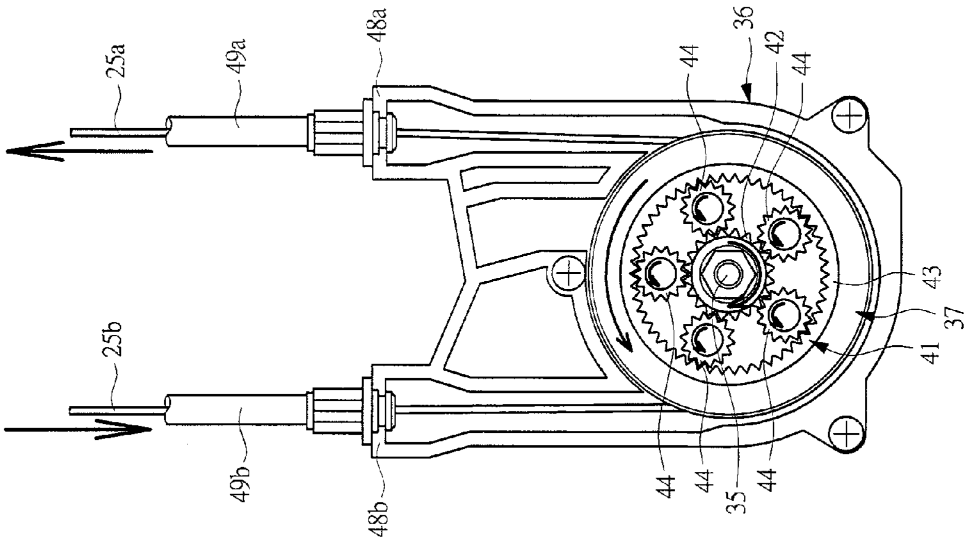
FIG. 8B is an explanatory view showing a drive state of each cable by the drive unit.
Figure 8A:
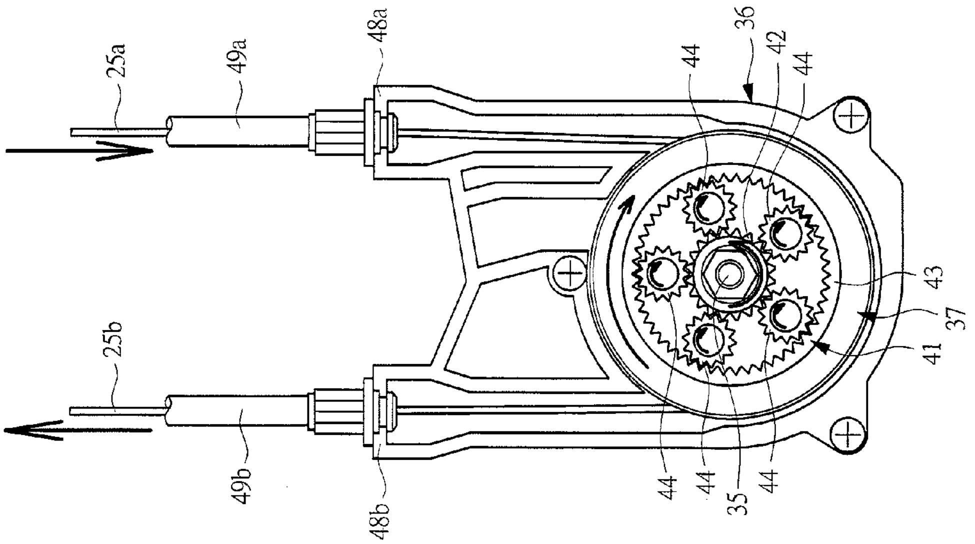
FIG. 8A is an explanatory view showing a drive state of each cable by the drive unit.

FIGS. 8A and 8B are each an explanatory view showing a drive state of each of the cables by the drive unit.

If an open side of an opening/closing switch (not shown) is operated, when the output shaft 35 of the motor with speed reducing gear 32 is rotated in an opening direction (counterclockwise direction of FIG. 8A), as shown in FIG. 8A, the rotation of the output shaft 35 is transmitted to the drum 37 via the planetary gear mechanism 41, whereby the drum 37 is rotated in an opening direction (clockwise direction in FIG. 8A). Accordingly, the close-side cable 25*b* is reeled by the drum 37 as well as the open-side cable 25*a* is paid out from the drum 37, and the lower arm 15 is towed by the open-side cable 25*a*, whereby the slide door 14 is automatically opened. On the contrary, if a close side of the opening/closing switch (not shown) is operated, when the output shaft 35 of the motor with speed reducing gear 32 is inverted so as to be rotated in a closing direction (clockwise direction in FIG. 8B), as shown in FIG. 8B, the rotation of the output shaft 35 is transmitted to the drum 37 via the planetary gear mechanism 41, so that the drum 37 is rotated in a closing direction (counterclockwise direction in FIG. 8B). Accordingly, the open-side cable 25*a* is reeled by the drum 37 as well as the close-side cable 25*b* is paid out from the drum 37, and the lower arm 15 is towed by the close-side cable 25*b*, so that the slide door 14 is automatically closed. Thus, the opening/closing apparatus 24 is a self-propelled type of driving the cables 25*a* and 25*b* coupled to both ends of the lower rail 17 by the motor with speed reducing gear 32 arranged inside the slide door 14 to automatically open and close the slide door 14.

Incidentally, in order to transmit the rotation of the output shaft 35 to the drum 37 by the planetary gear mechanism 41, it is necessary to constrain the carrier 45 of the planetary gear mechanism 41, that is, to make the carrier 45 non-rotatable, and such a structure will be described below.

As shown in FIG. 3, the opening/closing apparatus 24 is provided with a door-lock mechanism 51 in order that the slide door 14 closed up to the fully-closed position is retained at the same position.

Figure 9:
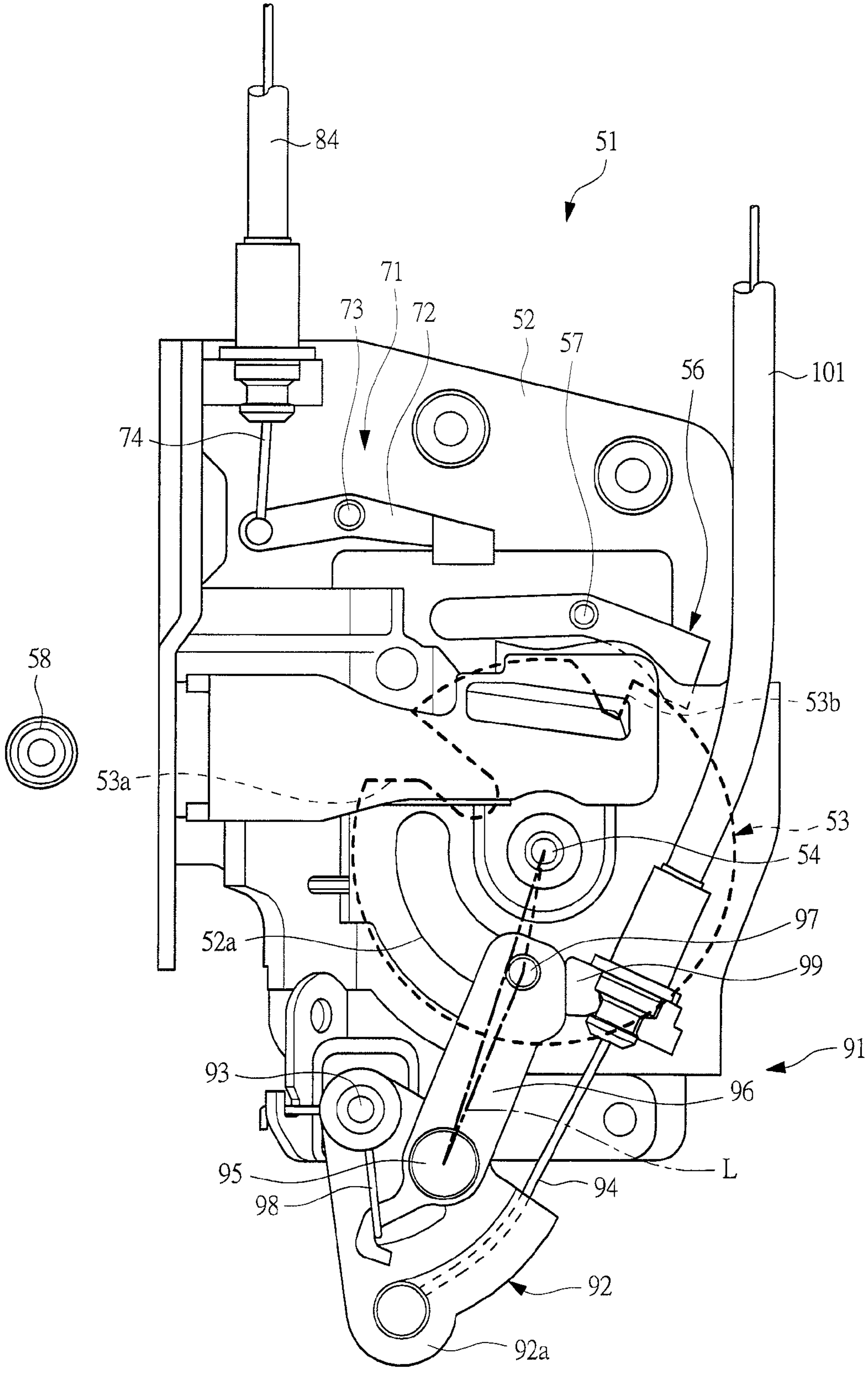
FIG. 9 is a front view showing a detail of a door-lock mechanism shown in FIG. 3.

FIG. 9 is a front view showing a detail of the door-lock mechanism shown in FIG. 3. The door-lock mechanism 51 has a base bracket 52 formed of a steel plate or the like, wherein an end portion on the vehicle-rear side of the slide door 14 is fixed to the base bracket 52.

The base bracket 52 has a structure in which a space is provided between two front and back plate members, and a latch 53 is accommodated in the space. The latch 53 is formed by a steel plate or the like into an approximately disk shape whose outer periphery is provided with a latch groove 53*a* and a half latch groove 53*b*, and the latch is supported to the base bracket 52 by a latch shaft 54 at its axis, thereby being rotatable between an unlatch position and a full latch position passing through a half latch position.

A ratchet 56 for retaining the latch 53 at the half latch position and the full latch position is provided outside the latch 53. The ratchet 56 is supported to the base bracket 52 by a ratchet shaft 57 to be rotatable in approaching and separating directions to and from the latch 53. Further, a return spring (not shown) is mounted on the ratchet shaft 57, whereby the ratchet 56 is biased in a direction (clockwise direction in FIG. 9) of being always pressed to an outer periphery of the latch 53 by the return spring.

As shown in FIGS. 2 and 3, a striker 58 is fixed to an end portion located on the vehicle-rear side of the opening portion 13 in the vehicle body 12 correspondingly to the latch 53. The striker 58 is formed into a rod shape by a steel member or the like, and is arranged so that its axial direction is directed toward the vehicle-front side (direction of becoming parallel to the latch shaft 54 when the slide door 14 is closed at the fully-closed position). Incidentally, a shape of the striker 58 is not limited to the rod shape, and may be a C-shaped shape.

When the slide door 14 is closed toward the fully-closed position and the striker 58 enters inside the base bracket 52 to be engaged with the latch groove 53*a* of the latch 53, the latch 53 is pushed by the striker 58 to be rotated toward a full latch direction. If the slide door 14 is closed near a half door position, the latch 53 is rotated up to a half latch position and the ratchet 56 is engaged with the half latch groove 53*b* of the latch 53. Accordingly, the rotation of the latch 53 in the unlatch direction is regulated by the ratchet 56, and the latch 53 is retained at the half latch position, whereby the slide door is retained in a half door state due to engagement of the latch 53 and the striker 58. Incidentally, if the slide door 14 is closed up to the half door position, the door seal member 14*a* abuts on the vehicle body 12, whereby the closing motion of the slide door 14 by the drive unit 31 is temporarily stopped or decelerated by an elastic force thereof. When the slide door 14 is further moved in a closing direction so as to be closed at the fully-closed position, the latch 53 reaches the full latch position and the ratchet 56 is engaged with the latch groove 53*a* of the latch 53. Accordingly, the rotation of the latch 53 in the unlatch direction is regulated by the ratchet 56 so that the latch is retained at the full latch position, whereby the slide door 14 is retained at the fully-closed position due to the engagement of the latch 53 and the striker 58.

Meanwhile, as shown in FIGS. 2 and 3, the slide door 14 is provided with a full-open hook mechanism 61 serving as an open-state retaining mechanism for retaining the slide door 14 at a predetermined open position, that is, a fully-opened position.

Figure 10:
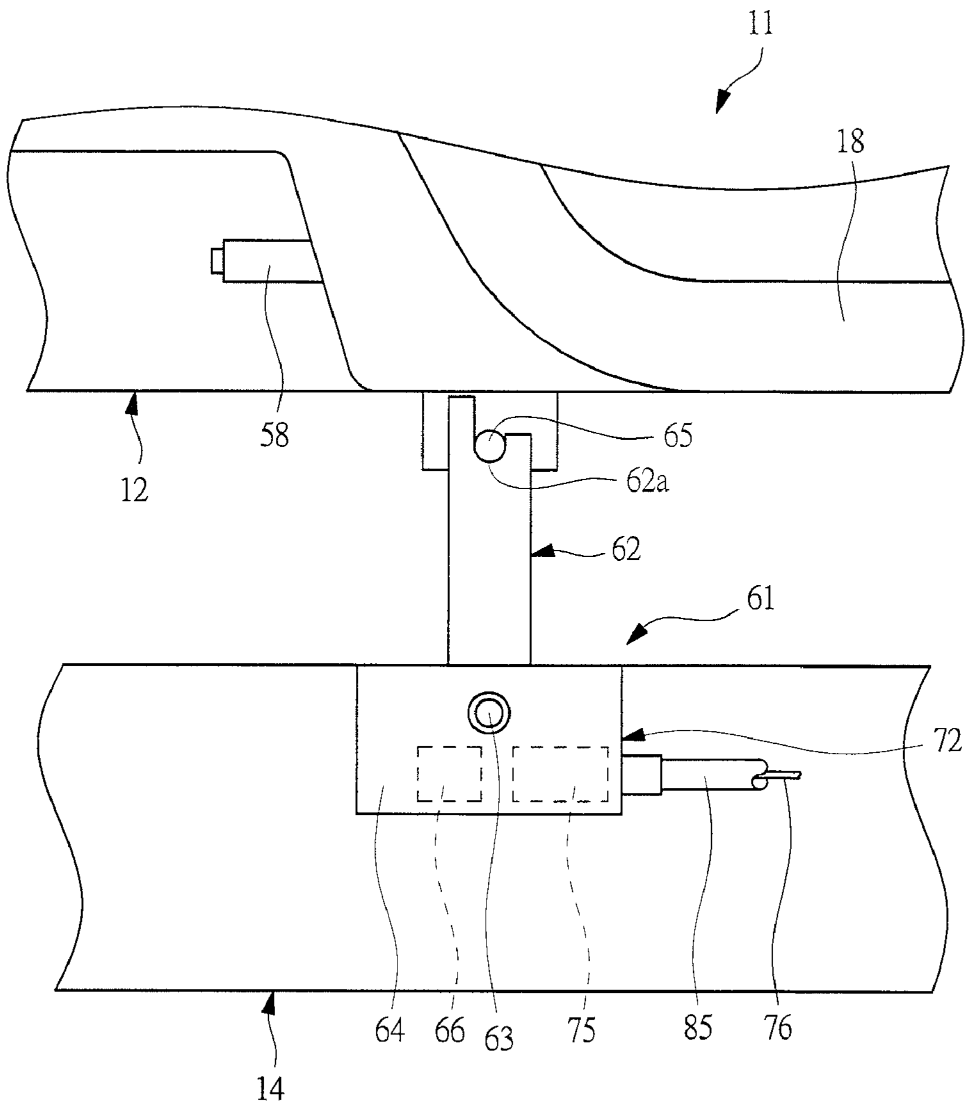
FIG. 10 is a plan view showing a detail of a full-open hook mechanism shown in FIG. 3.

FIG. 10 is a plan view showing a detail of the full-open hook mechanism shown in FIG. 3. The full-open hook mechanism 61 has a hook arm 62, and the hook arm 62 is supported via a support shaft 63 by a base case 64 which is disposed in the slide door 14 by one end of the support shaft, so that the hook arm is oscillatable between a lock position whose axial direction is approximately orthogonal to the vehicle-forward and -backward directions and an unlock position of being inclined with respect to the lock position.

Meanwhile, a striker 65 serving as an engaging member is fixed to the vehicle body 12 correspondingly to the hook arm 62, and when the slide door 14 is opened up to the fully-opened position while the hook arm 62 is at the unlock position, the striker 65 is engaged with an engagement groove 62*a* provided in a tip of the hook arm 62, whereby the hook arm 62 is oscillated up to the lock position.

A lock mechanism 66 (not shown in detail) is provided inside the base case 64, and the hook arm 62 engaged with the striker 65 to reach the lock position is retained at the lock position by the lock mechanism 66, whereby oscillation of the hook arm in the unlock direction is regulated. Accordingly, the slide door 14 opened up to the fully-opened position is retained at the fully-opened position due to the engagement between the hook arm 62 and the striker 65.

As shown in FIG. 9, the door-lock mechanism 51 is provided with an opening-operation releaser mechanism 71 for automatically releasing the retention (lock) of the slide door 14 toward the fully-closed position by the door-lock mechanism 51, that is, the retention of the latch 53 at the full latch position by the ratchet 56. The opening-operation releaser mechanism 71 has a releaser lever 72, and the releaser lever 72 is supported to the base bracket 52 by a releaser shaft 73 so that its intermediate portion is oscillatable. Further, one tip portion of the releaser lever 72 abuts on one end of the ratchet 56 engaged with the latch 53, and an opening-operation releaser cable 74 is coupled to the other tip portion thereof. Incidentally, the releaser lever 72 is mechanically coupled to the door handle 14*b*, and when an operator operates the door handle 14*b* while the slide door 14 is retained (locked) at the fully-closed position by the door-lock mechanism 51, the releaser lever 72 is actuated, thereby allowing the retention of the latch 53 at the full latch position to be released by the ratchet 56.

Figure 11A:
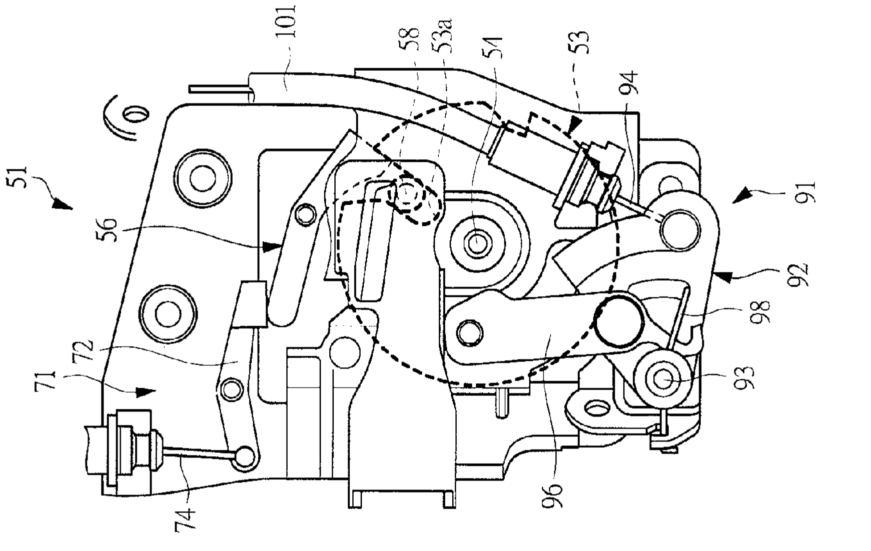
FIG. 11A is an explanatory view showing a releasing operation of a ratchet by an opening-operation releaser mechanism.
Figure 11B:
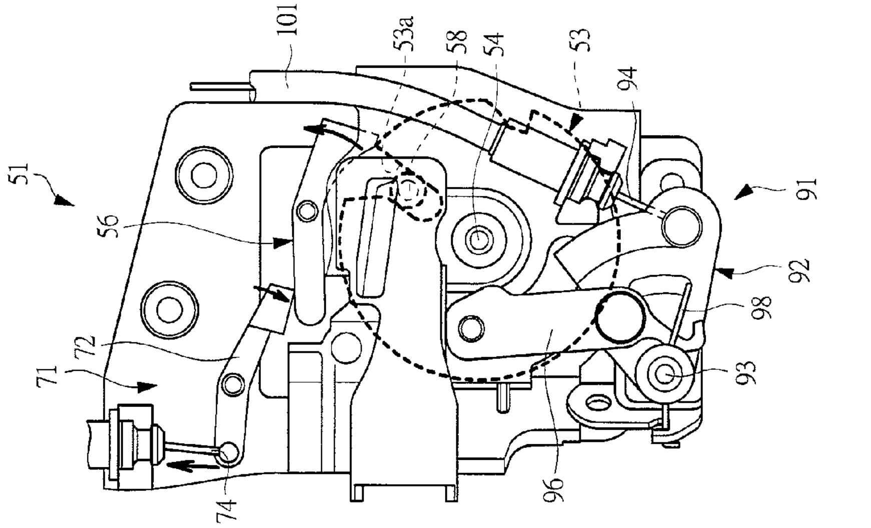
FIG. 11B is an explanatory view showing a releasing operation of a ratchet by an opening-operation releaser mechanism.
Figure 11C:
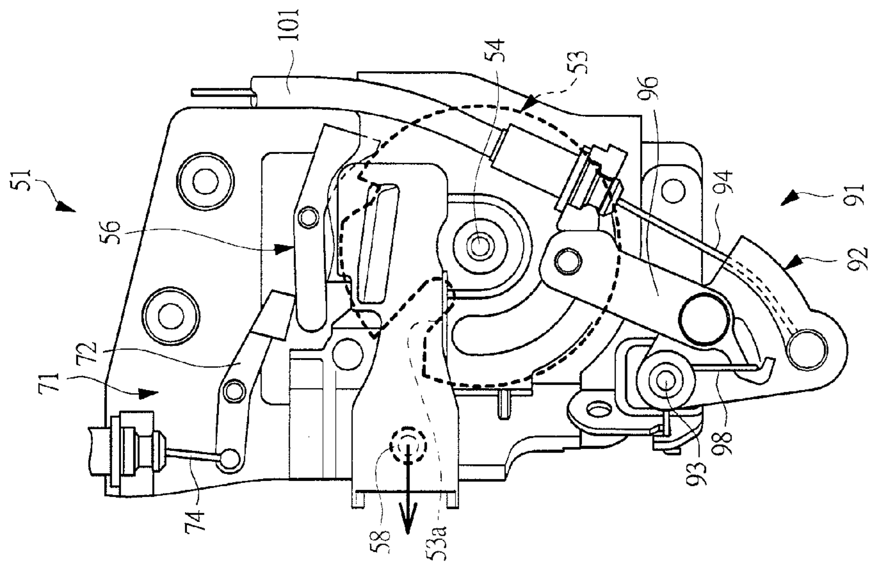
FIG. 11C is an explanatory view showing a releasing operation of a ratchet by an opening-operation releaser mechanism.

FIGS. 11A to 11C are explanatory views each showing a releasing motion of the ratchet by the opening-operation releaser mechanism. As shown in FIG. 11A, when the opening-operation releaser cable 74 is pulled upward in Figure while the ratchet 56 is engaged with the latch 53 maintained at the full latch position so that the slide door 14 is retained at the fully-closed position, as shown in FIG. 11B, the releaser lever 72 is rotated in a clockwise direction of FIG. 11B. Accordingly, the ratchet 56 is pushed by the releaser lever 72 to be rotated in a counterclockwise direction of FIG. 11, that is, a direction of being separate from the latch 53, and the engagement of the ratchet 56 with the latch 53 is released. If the engagement of the ratchet 56 with the latch 53 is released, as shown in FIG. 11C, the latch 53 is rotated up to the unlatch position, whereby the retention of the slide door 14 by the door-lock mechanism 51 is released.

Meanwhile, as shown in FIG. 10, the full-open hook mechanism 61 is provided with a closing-operation releaser mechanism 75 for automatically releasing the retention (lock) of the slide door 14 at the fully-opened position by the full-open hook mechanism 61, that is, the retention of the hook arm 62 by the lock mechanism 66. The closing-operation releaser mechanism 75 is accommodated inside the base case 64 adjacently to the lock mechanism 66, and is operated by the closing-operation releaser cable 76 connected thereto. Incidentally, the closing-operation releaser mechanism 75 is provided with biasing means (not shown) for always biasing the closing-operation releaser cable 76 in a pulling direction.

Figure 12C:
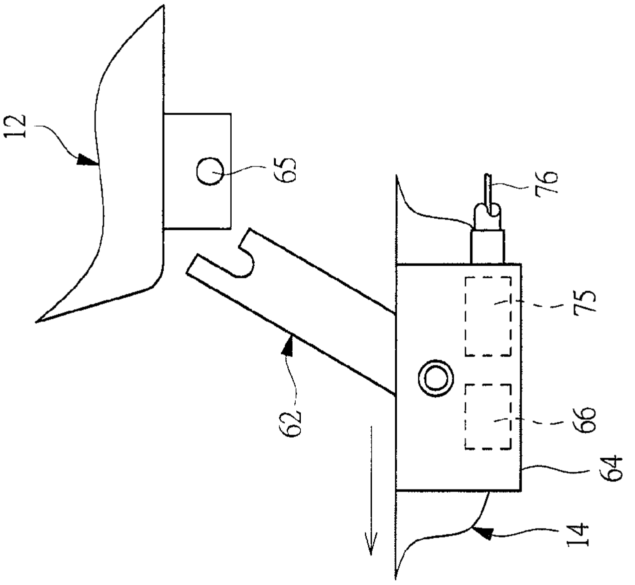
FIG. 12C is an explanatory view showing a releasing operation of a full-open hook mechanism by a closing-operation releaser mechanism.
Figure 12B:
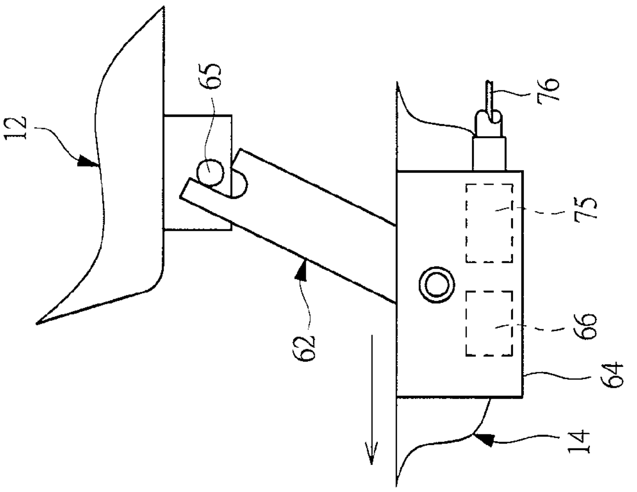
FIG. 12B is an explanatory view showing a releasing operation of a full-open hook mechanism by a closing-operation releaser mechanism.
Figure 12A:
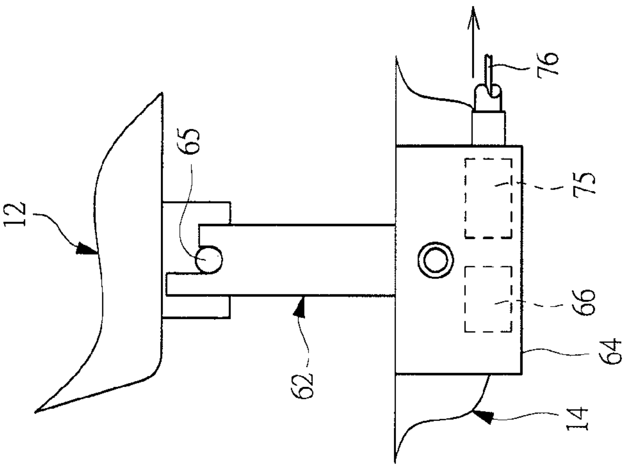
FIG. 12A is an explanatory view showing a releasing operation of a full-open hook mechanism by a closing-operation releaser mechanism.

FIGS. 12A to 12C are explanatory views each showing a releasing motion of the full-open hook mechanism by the closing-operation releaser mechanism. As shown in FIG. 12A, when the closing-operation releaser cable 76 is pulled on a right side in Figures while the hook arm 62 engaged with the striker 65 is retained at the lock position by the lock mechanism 66 so that the slide door 14 is retained at the fully-opened position, the lock mechanism 66 is caused to perform a releasing operation by the closing-operation releaser mechanism 75 from the lock state to the unlock state. Accordingly, as shown in FIG. 12B, the oscillation of the hook arm 62 onto an unlock side is permitted, and as shown in FIG. 12C, the retention of the slide door 14 by the full-open hook mechanism 61 is released.

As shown in FIG. 4, the drive unit 31 is provided with a releaser driving mechanism 81 for driving the opening-operation releaser cable 74 and the closing-operation releaser cable 76 to automatically actuate the respective releaser mechanisms 71 and 75.

Figure 13:
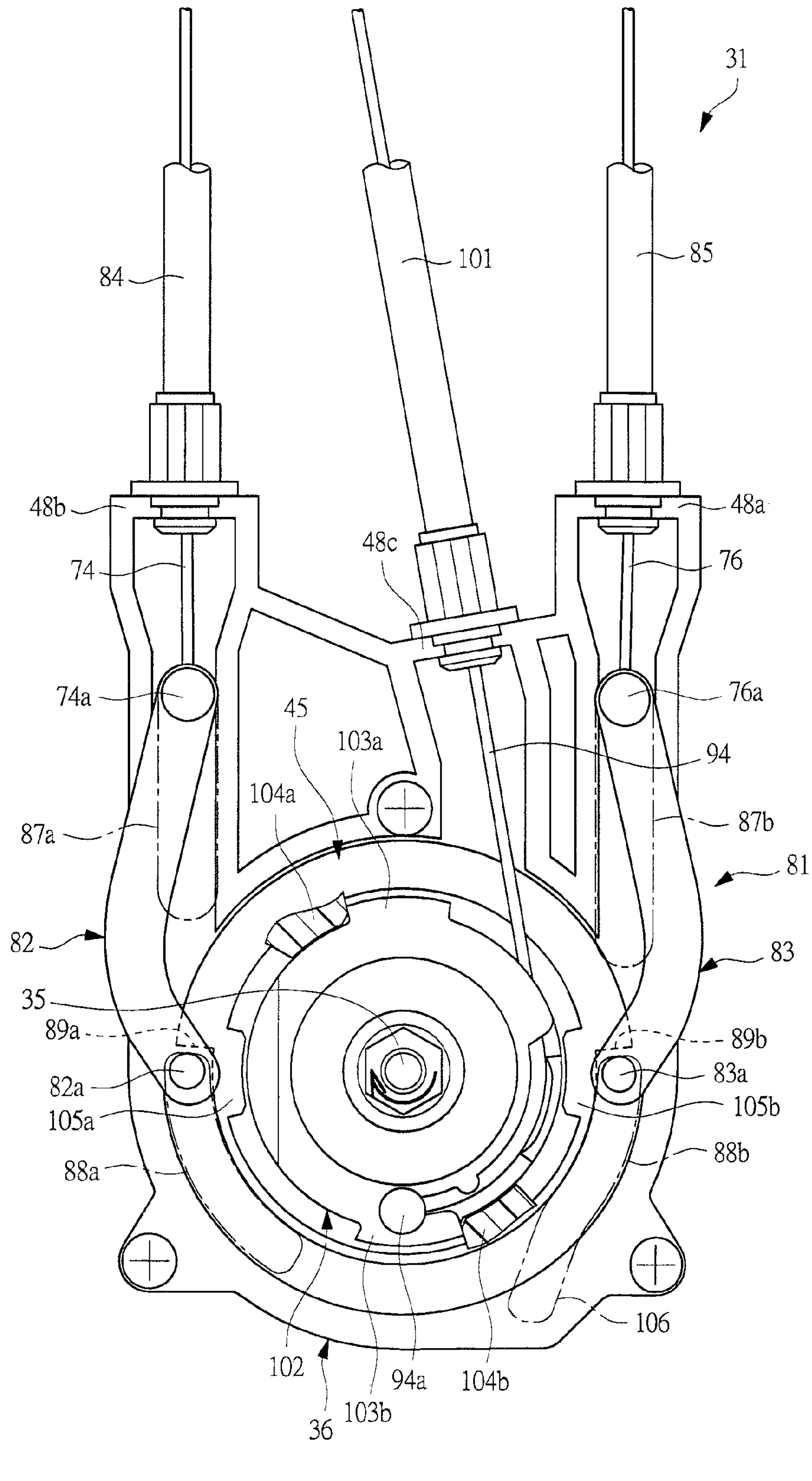
FIG. 13 is a front view showing a detail of a releaser driving mechanism shown in FIG. 4.

FIG. 13 is a front view showing a detail of the releaser driving mechanism shown in FIG. 4. The releaser driving mechanism 81 has an opening-operation drive arm 82 serving as an opening operation-releaser member, and a closing-operation drive arm 83 serving as a closing-operation releaser member. Each of these drive arms 82 and 83 is formed into a plate shape having predetermined length, and is formed into a J-shaped form whose axial lines are bent mutually inversely.

A columnar cable end 74*a* is fixed to the other end of the opening-operation releaser cable 74, and the opening-operation releaser cable 74 retracted inside the drum case 36 from the corresponding cable incoming/outgoing portion 48*b* is coupled to a base end portion of the opening-operation drive arm 82 in this cable end 74*a*. In the same manner, a columnar cable end 76*a* is fixed to the other end of the closing-operation releaser cable 76, and the closing-operation releaser cable 76 retracted inside the drum case 36 from the corresponding cable incoming/outgoing portion 48*a* is coupled to a base end portion of the closing-operation drive arm 83 in this cable end 76*a*. In the other words, the opening-operation drive arm 82 is coupled to the ratchet 56 via the opening-operation releaser cable 74 and the releaser lever 72, and the closing-operation drive arm 83 is coupled to the lock mechanism 66 via the closing-operation releaser cable 76 and the closing-operation releaser mechanism 75.

Incidentally, freely curved outer tubes 84 and 85, each of which is formed of a resin material with flexibility to be freely curved, are provided between the door-lock mechanism 51 and the drive unit 31 and between the full-open hook mechanism 61 and the drive unit 31. The opening-operation releaser cable 74 and the closing-operation releaser cable 76 are inserted into the outer tubes 84 and 85 to move along the outer tubes 84 and 85.

As shown by a dash-single-dot line in FIG. 13, the cover 86 of the drum case 36 is provided with a pair of guide grooves 87*a* and 87*b*, which extend in a tangential direction of the carrier 45 and become parallel to each other. The cable end 74*a* of the opening-operation releaser cable 74 coupled to a base end portion of the opening-operation drive arm 82 is movably engaged with the guide groove 87*a*, and the cable end 74*a* is guided along the guide groove 87*a*, whereby the base end portion of the opening-operation drive arm 82 is movable along the guide groove 87*a*. In the same manner, the cable end 76*a* of the closing-operation releaser cable 76 coupled to a base end portion of the closing-operation drive arm 83 is movably engaged with the guide groove 87*b*, and the cable end 76*a* is guided along the guide groove 87*b*, whereby the base end portion of the closing-operation drive arm 83 is movable along the guide groove 87*b*. Further, as shown by a dash-single-dot line in FIG. 13, the cover 86 is provided with a pair of guide grooves 88*a* and 88*b*, which are formed into circular arc shapes centering on the output shaft 35 and are bilaterally symmetrical in FIG. 13. A tip portion of the opening-operation drive arm 82 is provided with a columnar engagement projection 82*a* so as to protrude in both front and rear directions of the arm 82, and a protruding portion from one side of the engagement projection 82*a* is movably engaged with the guide groove 88*a*, whereby the tip portion of the opening-operation drive arm 82 is movable along the guide groove 88*a*. In the same manner, a tip portion of the closing-operation drive arm 83 is provided with a columnar engagement projection 83*a* so as to protrude in both front and back directions of the arm 83, and a protruding portion from one side of the engagement projection 83*a* is movably engaged with the guide groove 88*b*, whereby the tip portion of the closing-operation drive arm 83 is movable along the guide groove 88*b*. In accordance with a structure mentioned above, by causing the opening-operation drive arm 82 to move along the guide grooves 87*a* and 88*a* from an initial position shown in FIG. 13, it is possible to drive the opening-operation releaser cable 74 to cause the opening-operation releaser mechanism 71 to perform a releasing operation. Further, by causing the closing-operation drive arm 83 to move along the guide grooves 87*b* and 88*b* from the initial position shown in FIG. 13, it is possible to drive the closing-operation releaser cable 76 to cause the closing-operation releaser mechanism 75 to perform a releasing operation.

An opening-operation drive portion 89*a* is provided in the carrier 45 to drive the opening-operation drive arm 82 along the guide grooves 87*a* and 88*a*, and a closing-operation drive portion 89*b* is provided in the carrier 45 to drive the closing-operation drive arm 83 along the guide grooves 87*b* and 88*b*. The opening-operation drive portion 89*a* and the closing-operation drive portion 89*b* are each formed at a stepped portion where an outer diameter of the carrier 45 is changed, and formed into a surface shape parallel to a diametrical direction of the carrier 45, and the drive portions 89*a* and 89*b* are arranged so as to be bilaterally symmetrical with each other in FIG. 13 by regarding a center of the output shaft 35 as a reference. In the initial state shown in FIG. 13, the opening-operation drive portion 89*a* is positioned at a stroke end close to the cable incoming/outgoing portion 48*b* of the guide groove 88*a*, and the closing-operation drive portion 89*b* is positioned at a stroke end close to the cable incoming/outgoing portion 48*a* of the guide groove 88*b*. When the carrier 45 is rotated in a counterclockwise direction of FIG. 13, the opening-operation drive portion 89*a* is moved along the guide groove 88*a*, and when the carrier 45 is rotated in a clockwise direction of FIG. 13, the closing-operation drive portion 89*b* is moved along the guide groove 88*b*. Further, in the initial state shown in FIG. 13, the opening-operation drive portion 89*a* is positioned so as to be capable of abutting on the other protruding portion of the engagement projection 82*a* in the opening-operation drive arm 82, and the closing-operation drive portion 89*b* is positioned so as to be capable of abutting on the other protruding portion of the engagement projection 83*a* in the closing-operation drive arm 83. Further, the drive portions 89*a* and 89*b* are movable slightly until they abut on the engagement projections 82*a* and 83*a*, respectively. In other words, in this initial state, the carrier 45 is constituted slightly rotatably without actuating each of the engagement projections 82*a* and 83*a*, thereby preventing each of the drive arms 82 and 83 from being erroneously actuated by unexpected slight rotation of the carrier 45.

Figure 14A:
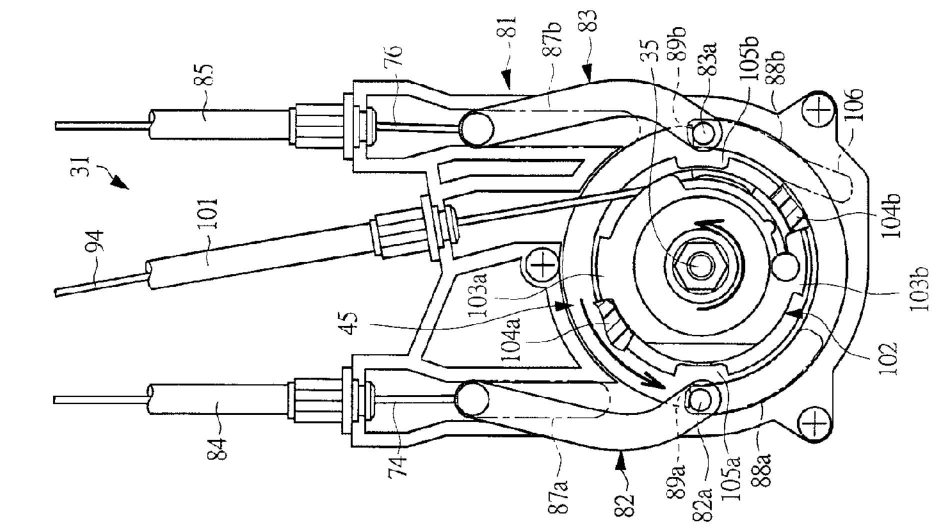
FIG. 14A is an explanatory view showing a driving procedure of an opening-operation releaser cable by the releaser driving mechanism.
Figure 14B:
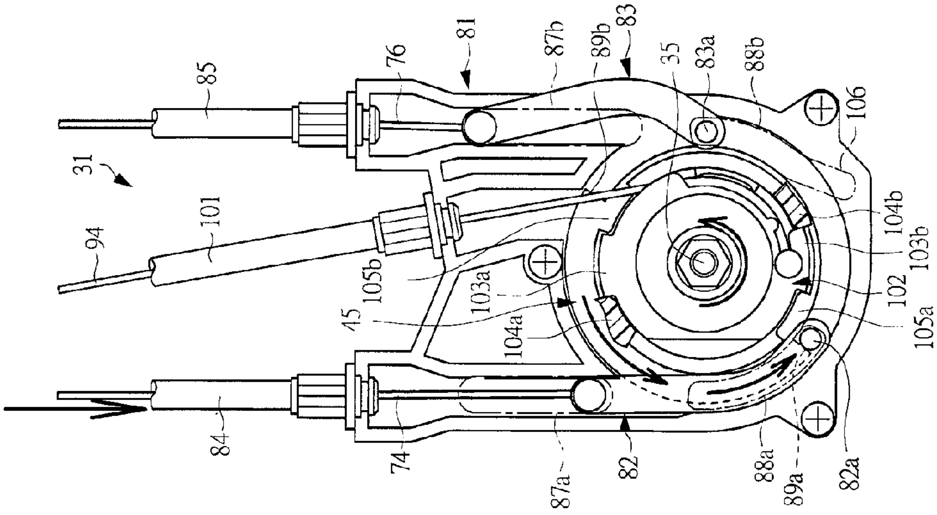
FIG. 14B is an explanatory view showing a driving procedure of an opening-operation releaser cable by the releaser driving mechanism.
Figure 14C:
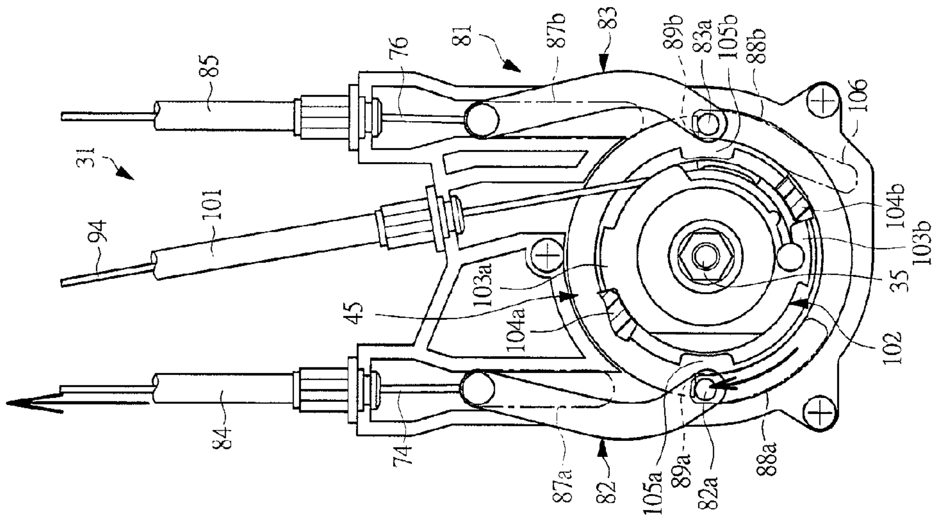
FIG. 14C is an explanatory view showing a driving procedure of an opening-operation releaser cable by the releaser driving mechanism.
Figure 15B:
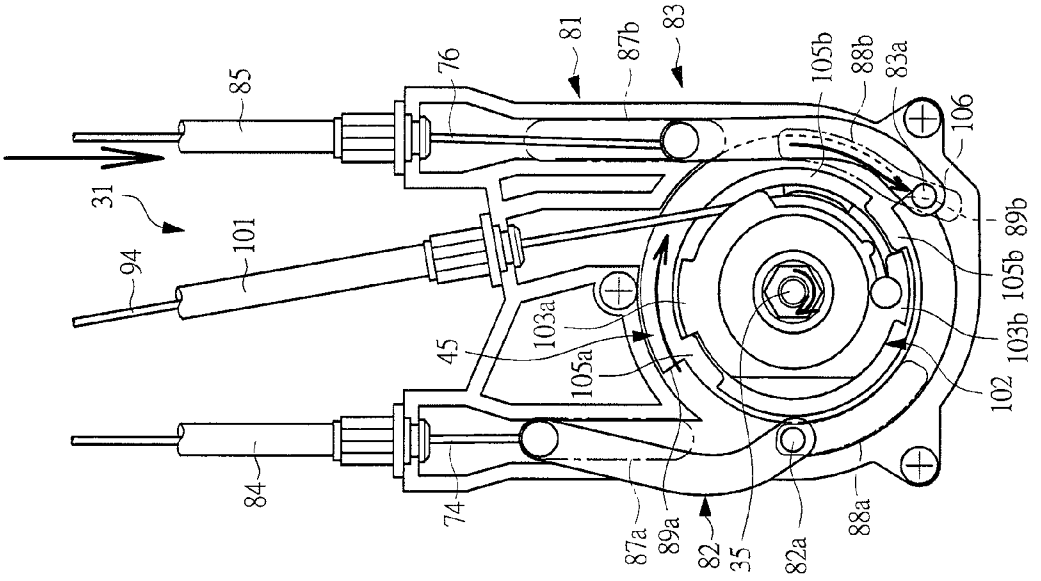
FIG. 15B is an explanatory view showing a driving procedure of a closing-operation releaser cable by the releaser driving mechanism.
Figure 15A:
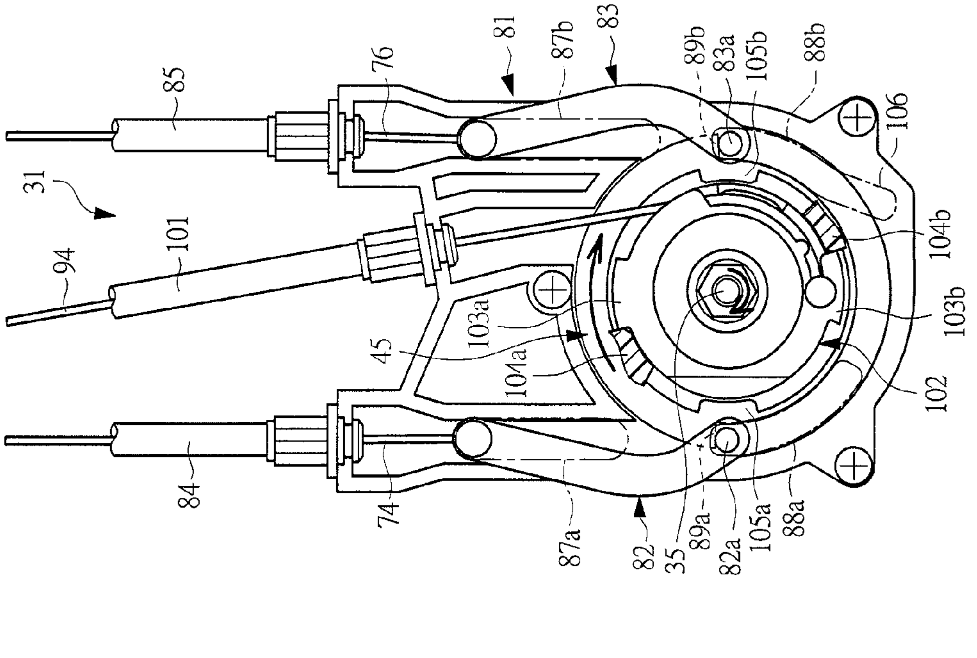
FIG. 15A is an explanatory view showing a driving procedure of a closing-operation releaser cable by the releaser driving mechanism.

FIGS. 14A to 14C are explanatory views each showing a driving procedure of the opening-operation releaser cable by the releaser drive mechanism, and FIGS. 15A and 15B are explanatory views each showing a driving procedure of the closing-operation releaser cable by the releaser drive mechanism.

In a state in which the slide door 14 is retained at the fully-closed position by the door-lock mechanism 51, the drum 37 is constrained to the vehicle body 12 via the open-side cable 25*a* and the slide door 14. Accordingly, when the open side of the opening/closing switch (not shown) is operated and the output shaft 35 of the motor with speed reducing gear 32 is rotated in the opening direction while the slide door 14 is retained at the fully-closed position by the door-lock mechanism 51, its rotating force is transmitted to the carrier 45 and, as shown in FIG. 14A, the carrier 45 is rotated in a counterclockwise direction. When the carrier 45 is rotated in the counterclockwise direction of FIG. 14A, as shown in FIG. 14B, the engagement projection 82*a* is pushed by the opening-operation drive portion 89*a*, and the opening-operation drive arm 82 is moved along the guide grooves 87*a* and 88*a*, whereby the opening-operation releaser cable 74 is actuated. When the opening-operation releaser cable 74 is actuated, as shown in FIG. 11, the ratchet 56 is caused to perform a releasing operation by the opening-operation releaser mechanism 71, and the retention of the slide door 14 at the fully-closed position by the door-lock mechanism 51 is released.

When the retention of the slide door 14 at the fully-closed position by the door-lock mechanism 51 is released, constraint of the drum 37 by the open-side cable 25*a* is released, whereby the rotating force of the output shaft 35 is transmitted to the drum 37 and, as shown in FIG. 8A, the drum 37 is rotated in the opening direction so that the slide door 14 is automatically opened toward the fully-opened position.

When the slide door 14 reaches the fully-opened position to be retained at the fully-opened position by the full-open hook mechanism 61, the motor with speed reducing gear 32 is stopped by the control apparatus, and then the electromagnetic clutch is switched to a power shutoff state. Accordingly, since the opening-operation drive arm 82 is pulled by a spring force of the return spring biasing the releaser lever 72 via the opening-operation releaser cable 74, as shown in FIG. 14C, the carrier 45 is driven by the opening-operation drive arm 82 to be returned to the initial position.

Next, in a state in which the slide door 14 is retained at the fully-opened position by the full-open hook mechanism 61, the drum 37 is constrained by the vehicle body 12 via the close-side cable 25*b* and the slide door 14. For this reason, when the close side of the opening/closing switch (not shown) is actuated and the output shaft 35 of the motor for speed reducing gear 32 is rotated in the closing direction while the slide door 14 is retained at the fully-opened position by the full-open hook mechanism 61, its rotating force is transmitted to the carrier 45 and, as shown in FIG. 15A, the carrier 45 is rotated in the clockwise direction. When the carrier 45 is rotated in the clockwise direction of FIG. 15A, as shown in FIG. 15B, the engagement projection 83*a* is pushed by the closing-operation drive portion 89*b,* and the closing-operation drive arm 83 is moved along the guide grooves 87*b* and 88*b,* whereby the closing-operation releaser cable 76 is actuated. When the closing-operation releaser cable 76 is actuated, as shown in FIG. 12, the lock mechanism 66 is caused to perform a releasing operation by the closing-operation releaser mechanism 75, whereby the retention of the slide door 14 at the fully-opened position by the full-open hook mechanism 61 is released.

When the retention of the slide door 14 at the fully-opened position by the full-open hook mechanism 61 is released, the constraint of the drum 37 by the close-side cable 25*b* is disengaged, whereby the rotating force of the output shaft 35 is transmitted to the drum 37 and, shown in FIG. 8B, the drum 37 is rotated in the closing direction so that the slide door 14 is automatically closed toward the fully-closed position.

Further, as described above, when the slide door 14 is retained at the fully-closed position due to the operation of the door-lock mechanism 51, the motor with speed reducing gear 32 is stopped by the control apparatus, and then the electromagnetic clutch is switched to the power shutoff state. Accordingly, since the closing-operation drive arm 83 is pulled by a spring force of the biasing means provided in the closing-operation releaser mechanism 75 via the closing-operation releaser cable 76, the carrier 45 is driven by the closing-operation drive arm 83 so as to be returned to the initial position for becoming an initial state shown in FIG. 13.

Thus, in this opening/closing apparatus 24, when the slide door 14 is driven by the drive unit 31 to be automatically opened from the fully-closed position, it is possible to automatically cause the ratchet 56 engaged with the latch 53 to perform a releasing operation since the opening-operation drive arm 82 is driven by the output of the motor with speed reducing gear 32 for automatically opening and closing the slide door 14. Further, in this opening/closing apparatus 24, when the slide door 14 is driven by the drive unit 31 to be automatically closed from the fully-opened position, it is possible to cause the lock mechanism 66 of the full-open hook mechanism 61 to perform a releasing operation since the closing-operation drive arm 83 is driven by the output of the motor with speed reducing gear 32 for automatically opening and closing the slide door 14. Accordingly, without providing, as the releaser mechanism, an independent motor with speed reducing gear for causing the ratchet 56 and the lock mechanism 66 to perform releasing operations, it is possible to cause the single motor with speed reducing gear 32 to automatically open and close the slide door 14 and cause the door-lock mechanism 51 and the full-open hook mechanism 61 to perform releasing operations. Therefore, it is possible to downsize the opening/closing apparatus 24 and to enhance an equipment characteristic with the vehicle body 12.

Incidentally, in order to transmit the rotation of the output shaft 35 to the drum 37, it is necessary to constrain the carrier 45 so that the carrier cannot be rotated in addition to release of the constraint of the drum 37 by each of the cables 25*a* and 25*b,* and such a structure will be described later.

As shown in FIG. 9, the opening/closing apparatus 24 is provided with a closer mechanism 91 for retracting, against an elastic force of the door seal member 14*a,* the slide door 14 closed at the half-door position up to the fully-closed position.

Incidentally, the present embodiment is set so that when the roller assembly 22 reaches a curve portion of the center rail 18, the slide door 14 is at the half door position, and that the slide door 14 is retracted by the closer mechanism 91 within a range of generating a drive loss due to the roller assembly 22 moving along the curve portion.

As shown in FIG. 9, the closer mechanism 91 has a drive lever 92 for driving the latch 53 in the full latch direction. A base end portion of the drive lever 92 is rotatably supported to the base bracket 52 of the door-lock mechanism 51 by a support shaft 93, and a tip of a closer cable 94 serving as a coupling member for closure is coupled to a coupling portion 92*a* provided to a tip side of the drive lever. One end of the coupling link 96 is rotatably coupled to an intermediate portion of the drive lever 92 by a pin member 95, and the other end of the coupling link 96 is rotatably coupled to the latch 53 by a pin member 97. In other words, the drive lever 92 is coupled to the latch 53 by the coupling link 96 to work with the latch 53.

A spring 98 is mounted on the support shaft 93, and the drive lever 92 and the coupling link 96 are biased toward an initial position (a clockwise direction of FIG. 9) by the spring 98. Accordingly, when the engagement of the ratchet 56 with the latch 53 is released, the latch 53 is rotated up to the unlatch position by a spring force of the spring 98, and the slide door 14 is disengaged from the retention by the latch 53. Further, a stopper block 99 is provided in the base bracket 52, so that when the latch 53 is at the unlatch position, the coupling link 96 abuts on the stopper block 99 so as to regulate the further rotation of the latch 53 in an unlatch direction (a counter-clockwise direction of FIG. 9).

When the drive lever 92 is rotated around the support shaft 93 by a traction force of the closer cable 94 in the counter-clockwise direction of FIG. 9 from the initial position (the position where the latch 53 is at the unlatch position) shown in FIG. 9, the latch 53 is driven by the drive lever 92 to be rotated from the unlatch position to the full latch position. At this time, the pin member 97 is moved like a circular arc shape along a circular-arc-shaped clearance groove 52*a* formed in the base bracket 52.

An outer tube 101 formed of a resin material with flexibility so as to be freely curved is provided between the base bracket 52 of the door-lock mechanism 51 and the cable incoming/outgoing portion 48*c* of the drive unit 31, and the closer cable 94 whose one end is coupled to the drive lever 92 is inserted to the outer tube 101 and is conducted inside the drum case 36.

As shown in FIG. 13, the drive unit 31 is provided with a closer drum 102 serving as a rotating body for closure for driving the closer cable 94. The closer drum 102 is formed into a cylindrical shape and, as shown in FIG. 6, is supported outside the boss portion 45*a* of the carrier 45 coaxially with and rotatably relatively to the carrier 45.

The closer cable 94 retracted inside the drum case 36 from the cable incoming/outgoing portion 48*c* is hanged over an outer periphery of the closer drum 102 and, as shown in FIG. 13, is fixed to the closer drum 102 by a columnar cable end 94*a* provided to an end portion of the closer cable. Accordingly, when the closer drum 102 is rotated in a clockwise direction of FIG. 13, the closer cable 94 is reeled by the closer drum 102 and then actuated.

As shown in FIG. 13, an outer periphery of the closer drum 102 is provided with a pair of driven convex portions 103*a* and 103*b* which protrude radially outward and are symmetrically spaced 180 degree from each other around an axis. On the other hand, the cover 86 of the drum case 36 is provided with a pair of stopper portions 104*a* and 104*b* (shown by a hatching of FIG. 13 for convenience) corresponding to the driven convex portions 103*a* and 103*b*. When the closer drum 102 is at the initial position (the position shown in FIG. 13), the respective driven convex portions 103*a* and 103*b* are biased in the counterclockwise direction of FIG. 13 by the spring 98 and abut on the corresponding stopper portions 104*a* and 104*b*, whereby the rotation of the closer drum 102 in the counterclockwise direction of FIG. 13 is regulated. Further, the carrier 45 is provided with a pair of driving convex portions 105*a* and 105*b* correspondingly to the driven convex portions 103*a* and 103*b*, and when the carrier 45 is rotated a predetermined angle toward the clockwise direction of FIG. 13 from an initial position (reference position) by the rotation of the motor with speed reducing gear 32 in the closing direction, the driving convex portions 105*a* and 105*b* abut on the driven convex portions 103*a* and 103*b* of the closer drum 102, and the closer drum 102 is driven by the carrier 45 to rotate together with the carrier 45. In other words, one end of the closer cable 94 is coupled to the latch 53 via the drive lever 92 and the coupling link 96, and the other end thereof is coupled to the carrier 45 via the closer drum 102, whereby the closer cable 94 can transmit the rotation of the carrier 45 to the latch 53.

Incidentally, the closer drum 102 is biased by the spring 98 in a direction of pulling the closer cable 94 toward the initial position, that is, in a direction of rotating the latch 53 in the unlatch direction, thereby preventing a slack of the closer cable 94 caused at a time of not actuating the closer mechanism 91 to enhance stability of its operation.

As shown in FIG. 9, in this opening/closing apparatus 24, the coupling link 96 which couples the latch 53 and the drive lever 92 is constituted as a toggle mechanism, thereby functioning as a switching mechanism for switching the motion of the slide door 14 from the automatic closing operation to the retracting operation brought by the closer mechanism 91 when the slide door 14 is closed up to the half door position.

Figure 16B:
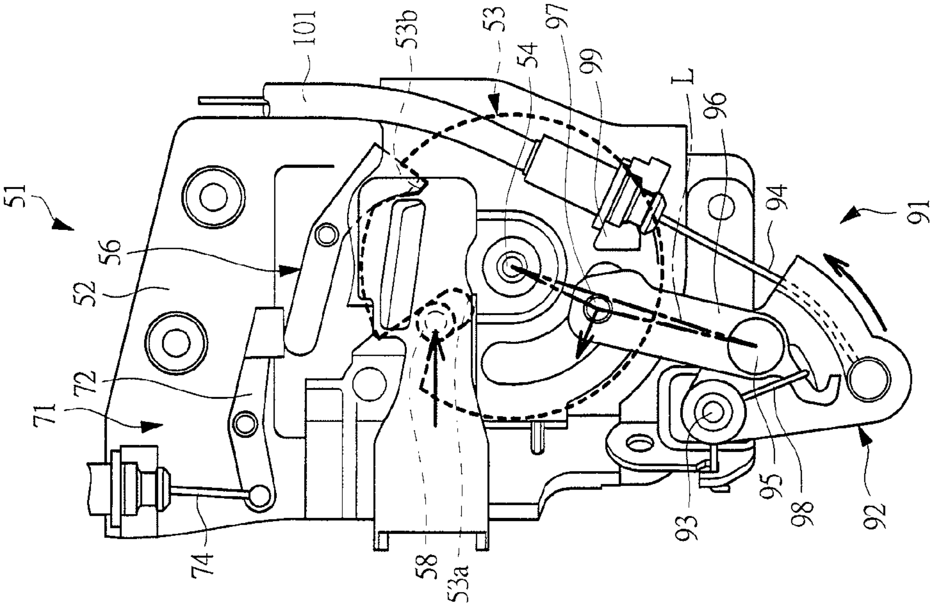
FIG. 16B is an explanatory view showing a switching operation for switching a motion of the slide door from an automatically opening operation to a pulling operation by a closer mechanism.
Figure 16A:
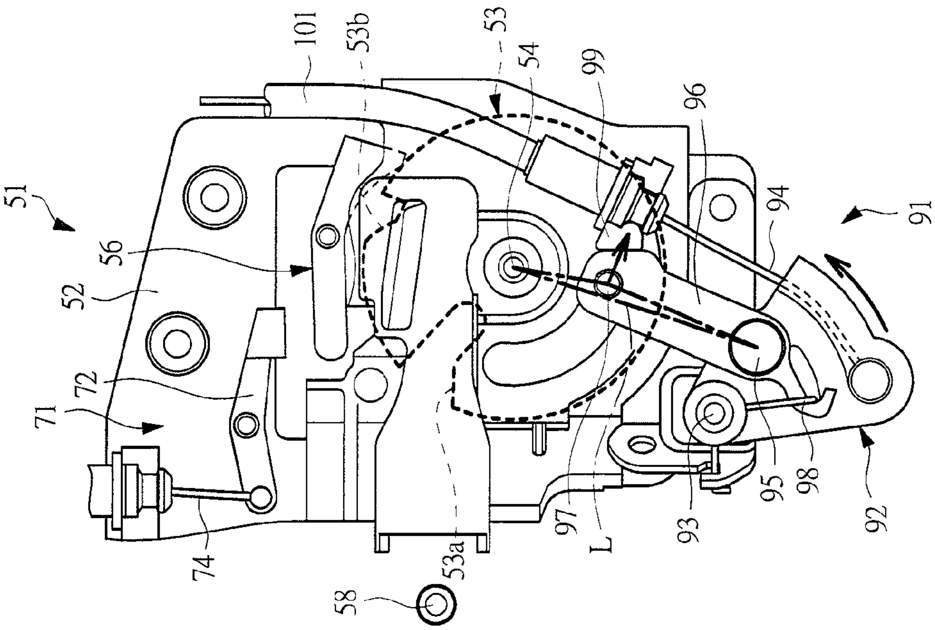
FIG. 16A is an explanatory view showing a switching operation for switching a motion of the slide door from an automatically opening operation to a pulling operation by a closer mechanism.

FIGS. 16A and 16B are explanatory views each showing the switching motion for switching the motion of the slide door from the automatic closing operation to the retracting operation brought by the closer mechanism.

When the latch 53 is at the unlatch position while the slide door 14 is opened further from the half door position, an axis of the pin member 97 coupling the latch 53 and the coupling link 96 is positioned on an unlatch side (a side located in a direction in which the latch 53 is rotated from the full latch position toward the unlatch position) with respect to a straight line "L" (virtual line) connecting a center of rotation of the latch 53, that is, an axis of the latch shaft 54 and an axis of the pin member 95 coupling the drive lever 92 and the coupling link 96. Accordingly, even if a traction force of the closer cable 94 is applied to the drive lever 92, the force is applied in a direction of rotating the latch 53 further in the unlatch direction via the coupling link 96, and the rotation of the latch 53 is regulated by the stopper block 99. In other words, when the latch 53 is at the unlatch position while the slide door 14 is opened further from the half door position, the traction force of the closer cable 94, that is, the rotation of the latch 53 in the full latch direction caused by the rotation of the carrier 45 closer drum 102) is regulated.

Meanwhile, when the slide door 14 in an open state is closed toward the fully-closed position, the striker 58 enters inside the base bracket 52 to be engaged with the latch groove 53*a* of the latch 53, and the latch 53 is pushed by the striker 58 to start rotating toward the full latch position direction from the unlatch position against the spring force of the spring 98. Further, as shown in FIG. 16B, the axis of the pin member 97 coupling the latch 53 and the coupling link 96 is moved on a full latch side (a side located in a direction in which the latch 53 is rotated from the unlatch position toward the full latch position) with respect to the straight line L connecting the axis of the latch shaft 54 and the axis of the pin member 95. Accordingly, when regulation of the rotation of the latch 53 by the toggle mechanism, that is, the switching mechanism is disengaged and when the traction force of the closer cable 94 is applied to the drive lever 92, the force is transmitted to the latch 53 via the coupling link 96, and the latch 53 is rotated toward the full latch position. Incidentally, in the present embodiment, a position where the regulation of the rotation of the latch 53 is disengaged by the switching mechanism is set to a position where the latch 53 reaches the half latch position, that is, a position where the ratchet 56 is engaged with the half latch groove 53*b* of the latch 53.

When the slide door 14 is automatically opened from the fully-closed position after the retention of the slide door 14 at the fully-closed position is disengaged by the opening-operation releaser mechanism 71, as shown in FIG. 14B, the driving convex portions 105*a* and 105*b* of the carrier 45 abut on the stopper portions 104*a* and 104*b* of the cover 86 via the driven convex portions 103*a* and 103*b* of the closer drum 102. Accordingly, the rotation of the carrier 45 in the counterclockwise direction of FIG. 14 is constrained, the rotation of the output shaft 35 in the opening direction is transmitted to the drum 37 as shown in FIG. 8A, and the slide door 14 is automatically opened. Meanwhile, when the slide door 14 is automatically closed from the fully-opened position after the retention of the slide door 14 at the fully-opened position is disengaged by the closing-operation release mechanism 75, as shown in FIG. 15B, the driving convex portions 105*a* and 105*b* of the carrier 45 abut on the driven convex portions 103*a* and 103*b* of the closer drum 102 in the state in which the rotation is regulated by the closer cable 94. Accordingly, the rotation of the carrier 45 in the clockwise direction of FIG. 15 is constrained, the rotation of the output shaft 35 in the closing direction is transmitted to the drum 37 as shown in FIG. 8B, and the slide door 14 is automatically closed.

Figure 17B:
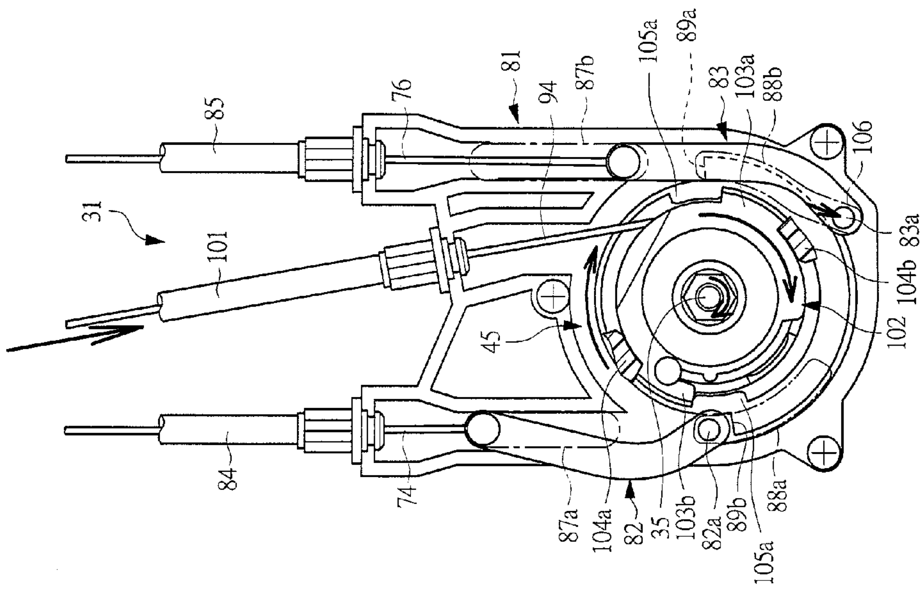
FIG. 17B is an explanatory view showing an operation of a closer drum.
Figure 17A:
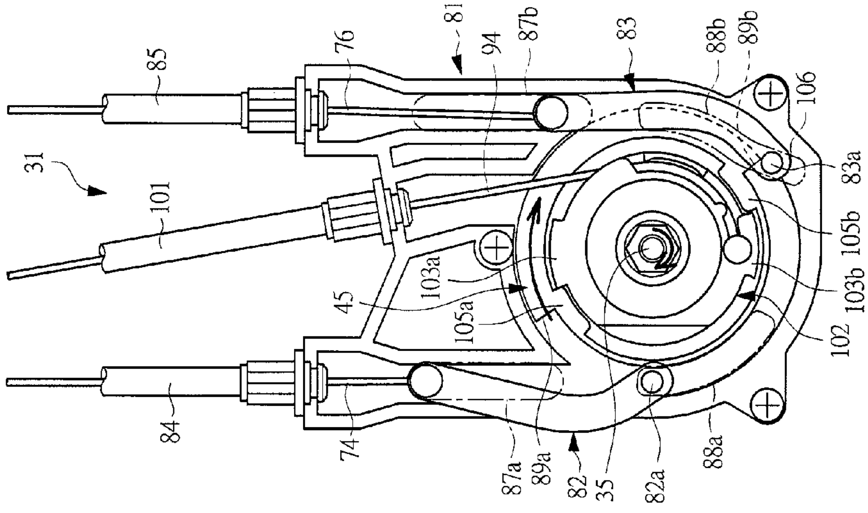
FIG. 17A is an explanatory view showing an operation of a closer drum.
Figure 18C:
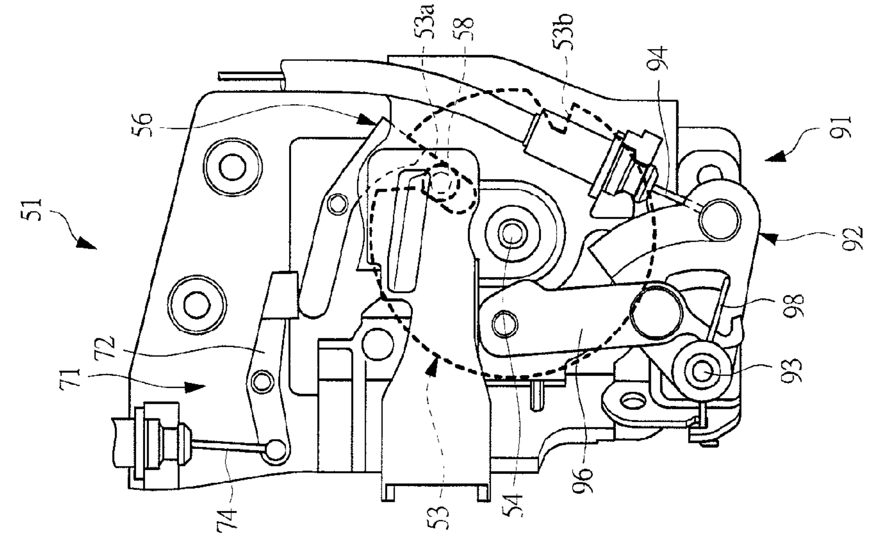
FIG. 18C is an explanatory view showing a drive state of a latch by the closer mechanism.
Figure 18B:
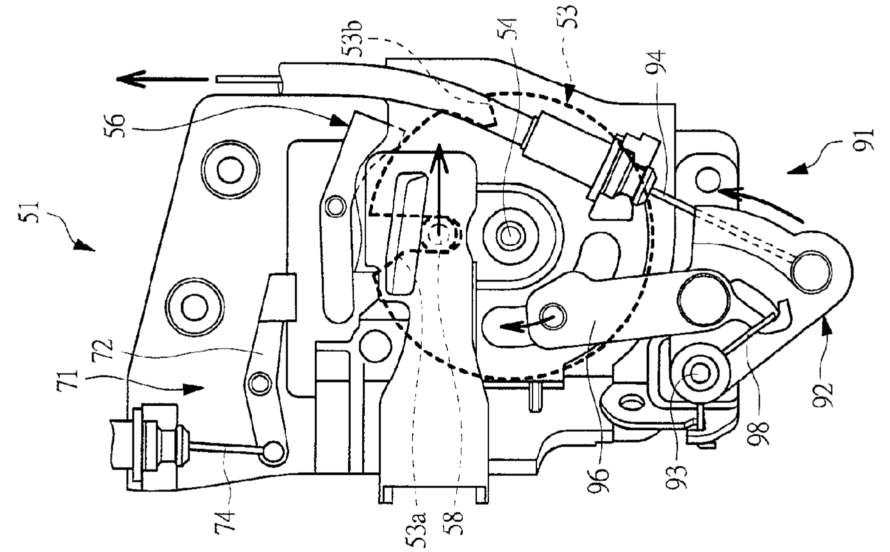
FIG. 18B is an explanatory view showing a drive state of a latch by the closer mechanism.
Figure 18A:
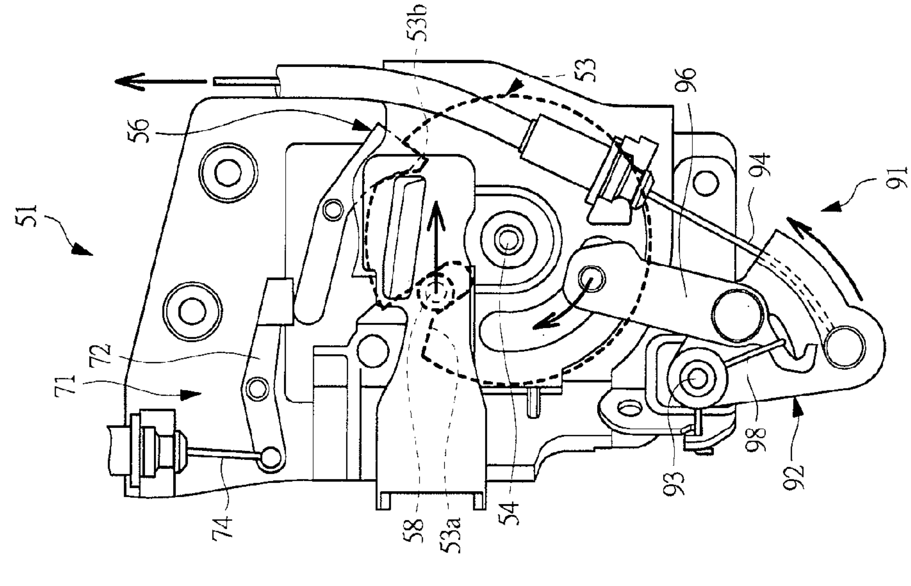
FIG. 18A is an explanatory view showing a drive state of a latch by the closer mechanism.

FIGS. 17A and 17B are explanatory views each showing an operation of the closer drum, and FIGS. 18A to 18C are explanatory views each showing a drive state of the latch by the closer mechanism.

When the carrier 45 is constrained to transmit the rotation of the output shaft 35 to the drum 37 and when the slide door 14 is automatically closed to close the slide door up to the half door position, the regulation of the operation of the drive lever 92 by the coupling link 96 is disengaged as shown in FIG. 16B. Further, when the slide door 14 reaches the half door position, a drive load of the drum 37 is increased due to a reaction force of the door seal member 14*a*. Accordingly, the rotation of the output shaft 35 of the motor with speed reducing gear 32 is transmitted to the carrier 45 as shown in FIG. 17A, and the carrier 45 starts rotating in a clockwise direction of FIG. 17A. When the carrier 45 is rotated, the driven convex portions 103*a* and 103*b* of the closer drum 102 are pushed by the driving convex portions 105*a* and 105*b*, and the closer drum 102 is rotated in the clockwise direction of FIG. 17A together with the carrier 45.

Now, the cover 86 is provided with a clearance groove 106 which is continuous with the guide groove 88*b* and is shifted outside with respect to the axis of the guide groove 88*b*, and when the closer drum 102 is rotated by the rotation of the carrier 45, the engagement projection 83*a* of the closing-operation drive arm 83 is guided by the clearance groove 106, and the engagement of the carrier 45 with the closing-operation drive portion 89*b* is released. Accordingly, when the closer drum 102 is actuated for rotation, the present embodiment has such a structure that the engagement projection 83*a* can be prevented from being pulled more than necessary by the closing-operation drive portion 89*b*.

When the engagement of the carrier 45 and the engagement projection 83*a* is released, as shown in FIG. 17B, the closer drum 102 and the carrier 45 can be rotated within a predetermined range in which the driven convex portions 103*a* and 103*b* of the closer drum 102 abut on the stopper portions 104*a* and 104*b* of the cover 86. Further, when the closer drum 102 is rotated by the rotation of the carrier 45 and when the closer cable 94 is driven, the traction force of the closer cable 94 is transmitted to the latch 53 via the drive lever 92 and, as shown in FIG. 18A, the latch 53 engaged with the striker 58 at a half latch position is driven via a position of FIG. 18B to a full latch position of FIG. 18C, whereby the slide door 14 is retracted up to the fully-closed position. In other words, when the slide door 14 is closed up to the half door position, the latch 53 is driven by the carrier 45 to be rotated in the full latch direction, and the slide door 14 is retracted up to the fully-closed position. Incidentally, driving the latch 53 up to the full latch position by the rotation of the closer drum 102 is set so as to be completed until the driven convex portions 103*a* and 103*b* of the closer drum 102 abut on the stopper portions 104*a* and 104*b* of the cover 86.

Thus, in the opening/closing apparatus 24, when the slide door 14 is closed up to the half door position, it is possible to drive the latch 53 up to the full latch position by the motor with speed reducing gear 32 for automatically opening and closing the slide door 14 and to retract, up to the fully-closed position, the slide door 14 having been closed at the half door position. Accordingly, without providing a motor for closer mechanism, that is, an independent motor with speed reducing gear for driving the latch 53 up to the full latch position, it is possible to cause the slide door 14 to be automatically opened and closed and perform a retracting operation up to the fully-closed position by the single motor with speed reducing gear 32. Therefore, it is possible to downsize the opening/closing apparatus 24 and to enhance an equipment characteristic with the vehicle body 12.

Figure 19:
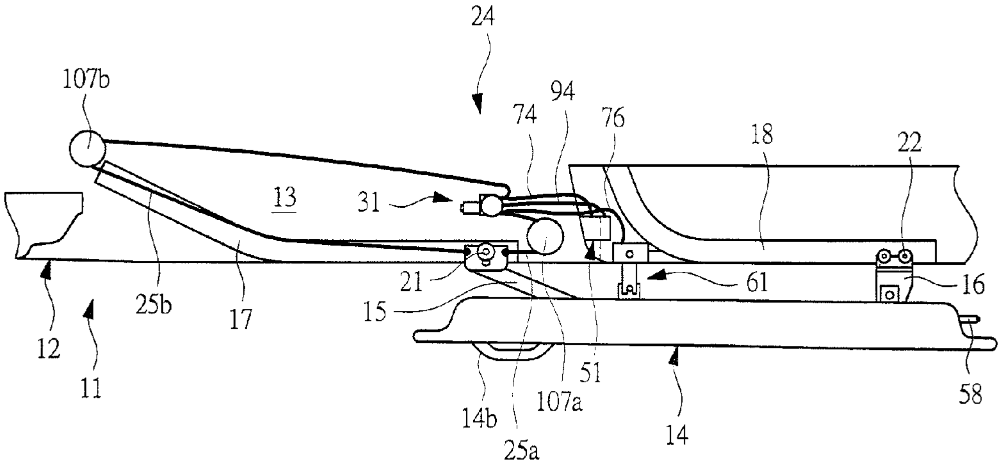
FIG. 19 is an explanatory view showing a modified example of the opening/closing apparatus shown in FIG. 2.

FIG. 19 is an explanatory view showing a modified example of the opening/closing apparatus shown in FIG. 2. Incidentally, in FIG. 19, the same reference numerals are denoted to members corresponding to the members mentioned above.

In the opening/closing apparatus 24 shown in FIG. 2, the lower rail 17 serving as a guide rail is fixed to the vehicle body 12; the lower arm 15 serving as a support arm is provided in the slide door 14; and the drive unit 31, the door-lock mechanism 51 and the full-open hook mechanism 61 are arranged inside the slide door 14. On the contrary, in the modified example shown in FIG. 19, the drive unit 31, the door-lock mechanism 51, and the full-open hook mechanism 61 are arranged in the vehicle body 12 which is located on the same side as that of the lower rail 17.

In this case, inversion pulleys 107*a* and 107*b* are provided to both end portions of the lower rail 17 in its longitudinal direction; a moving direction of the open-side cable 25*a* pulled from the drive unit 31 is inversed by the inversion pulley 107*a* so that a tip of the open-side cable is coupled to the lower arm 15 from an open side (vehicle-rear side) extending along the lower rail 17; and a moving direction of the close-side cable 25*b* is inverted by the inversion pulley 107*b* so that a tip of the close-side cable is coupled to the lower arm 15 from a close side (vehicle-front side) extending along the lower rail 17. Further, in this case, the striker 58 engaged with the latch 53 of the door-lock mechanism 51 is fixed to the slide door 14.

Figure 20:
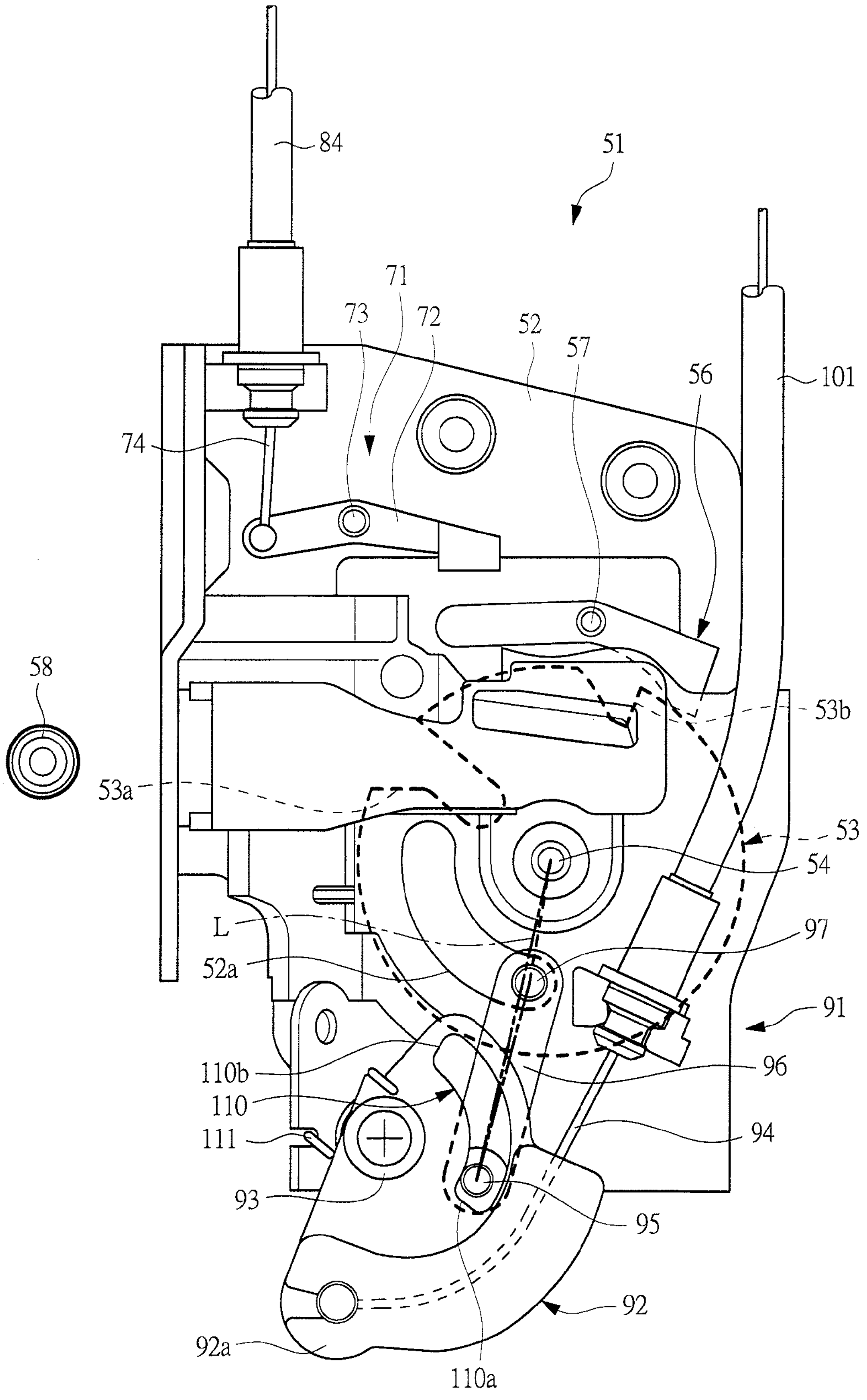
FIG. 20 is a front view showing a modified example of the closer mechanism shown in FIG. 9.

FIG. 20 is a front view showing a modified example of the closer mechanism shown in FIG. 9.

In the closer mechanism 91 shown in FIG. 9, one end of the coupling link 96 is rotatably coupled to the drive lever 92 by the pin member 95, thereby transmitting a driving force of the drive lever 92 to the coupling link 96. On the contrary, in the modified example shown in FIG. 20, the drive lever 92 is provided with a circular-arc-shaped long hole 110 centering on the support shaft 93, and the pin member 95 mounted to one end of the coupling link 96 is inserted into and coupled to the long hole 110, whereby the coupling link is supported by the drive lever 92 so as to be movable along the long hole 110. Accordingly, even if the drive lever 92 is at an initial position (position shown in FIG. 20), since the pin member 95 moves along the long hole 110, the latch 53 can be rotated between the unlatch position and the full latch position without working with the drive lever 92.

A spring 111 is mounted on the support shaft 93, and the drive lever 92 is biased by the spring 111 toward an initial position (in the clockwise direction of FIG. 9). Further, the latch 53 is always biased toward the unlatch position by a return spring (not shown) provided to the latch shaft 54, and the pin member 95 of the coupling link 96 coupled to the latch 53 is also biased toward an unlatch end 110*a* (one stroke end) of the long hole 110, whereby the pin member 95 is arranged at the unlatch end 110*a* of the long hole 110 in an initial state (state shown in FIG. 20).

FIGS. 21A to 21D are explanatory views each showing an operation of the closer mechanism shown in FIG. 20.

Figure 21A:
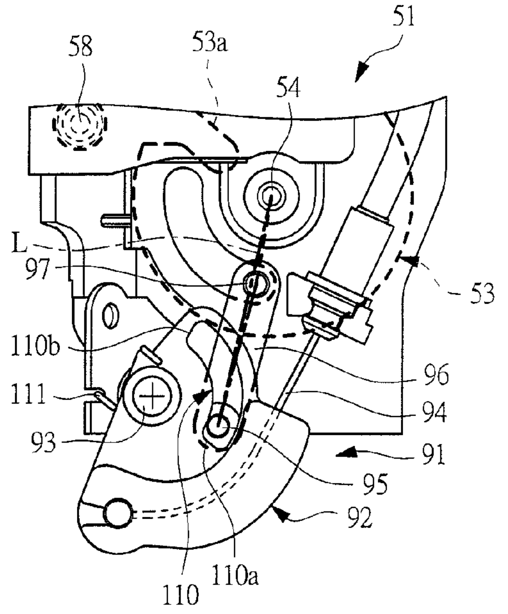
FIG. 21A is an explanatory view showing an operation of the closer mechanism shown in FIG. 20.

When the latch 53 is at the unlatch position while the slide door 14 is opened further from the half door position, as shown in FIG. 21A, the axis of the pin member 97 coupling the latch 53 and the coupling link 96 is on the unlatch side with respect to the straight line L, and the rotation of the latch 53 at the full latch direction by the traction force of the closer cable 94 is regulated in the same manner as a case shown in FIG. 16A.

Figure 21B:
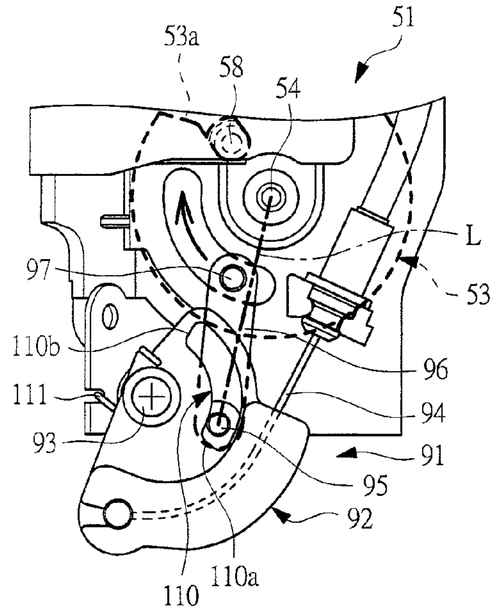
FIG. 21B is an explanatory view showing an operation of the closer mechanism shown in FIG. 20.

When the slide door 14 is closed toward the fully-closed position from the above-mentioned state, the latch 53 is pushed by the striker 58 to be rotated from the unlatch position toward the full latch position and, as shown in FIG. 21B, the axis of the pin member 97 is moved further on the full latch side with respect to the straight line L, and the regulation of the rotation of the latch 53 by the toggle mechanism, that is, the switching mechanism is disengaged in the same manner as a case shown in FIG. 16B.

At this time, since the drive lever 92 is coupled to the pin member 95 in the long hole 110, speed of closing the slide door 14, that is, intruding speed of the striker 58 with respect to the latch 53 is high. For this reason, even if the pin member 95 of the coupling link 96 starts moving prior to the rotation of the drive lever 92 caused due to the traction force of the closer cable 94, the pin member 95 is moved toward a full latch end 110*b* of the long hole 110 along the long hole 110, whereby no slack is generated in the closer cable 94. Accordingly, it is possible to securely actuate the closer mechanism 91.

Figure 21C:
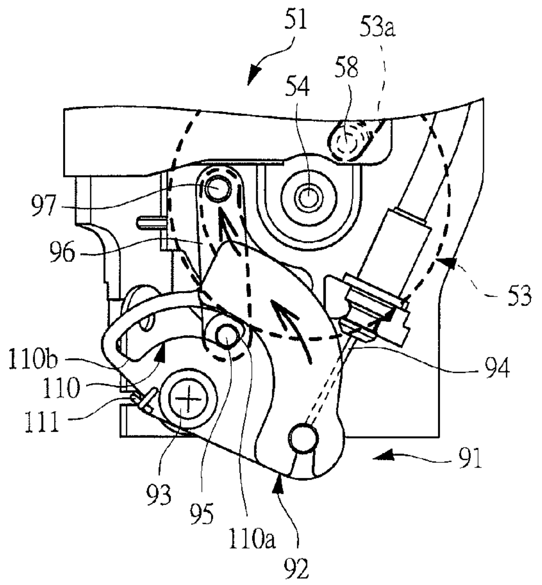
FIG. 21C is an explanatory view showing an operation of the closer mechanism shown in FIG. 20.

When the regulation of the rotation of the latch 53 by the toggle mechanism is disengaged, the drive lever 92 is rotated due to the traction force of the closer cable 94, and the pin member 95 is driven by the drive lever 92 at the unlatch end of the long hole 110. Accordingly, as shown in FIG. 21C, the latch 53 is rotated up to the full latch position.

Figure 21D:
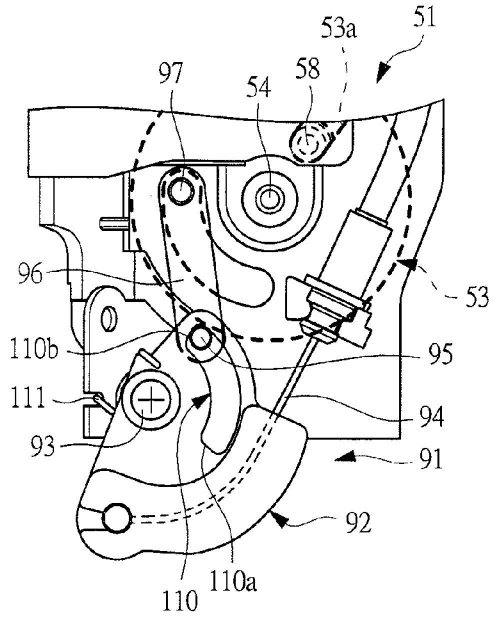
FIG. 21D is an explanatory view showing an operation of the closer mechanism shown in FIG. 20.

When the latch 53 is rotated up to the full latch position and when an electromagnetic clutch (not shown) of the drive unit 31 is switched to a power shutoff state, the rotation of the closer drum 102 becomes free and, as shown in FIG. 21D, the drive lever 92 is biased by the spring force of the spring 111 to perform a returning operation to the initial position while pulling the closer cable 94. At this time, the latch 53 and the coupling link 96 are each maintained in the full latch state. However, since the pin member 95 is coupled to the drive lever 92 in the long hole 110, the drive lever 92 can be caused to smoothly perform the returning operation without trailing the coupling link 96 and the pin member 95. Incidentally, after the drive lever 92 performs the returning operation, the pin member 95 is arranged at the full latch end 110*b* of the long hole 110.

Meanwhile, when the open side of the opening/closing switch (not shown) is operated to release automatically the engagement of the ratchet 56 with the latch 53 by the opening-operation releaser mechanism 71 while the slide door 14 is retained at the fully-closed position by the door-lock mechanism 51, the pin member 95 is biased by the return spring (not shown) to be moved to the unlatch end 110*a* of the long hole 110 along the long hole 110 of the drive lever 92 present at the initial position, whereby the latch 53 is rotated from the full latch position to the unlatch position and is returned to the initial position shown in FIG. 20.

Incidentally, in FIGS. 20 and 21, the same reference numerals are denoted to members corresponding to the members mentioned above.

Figure 22:
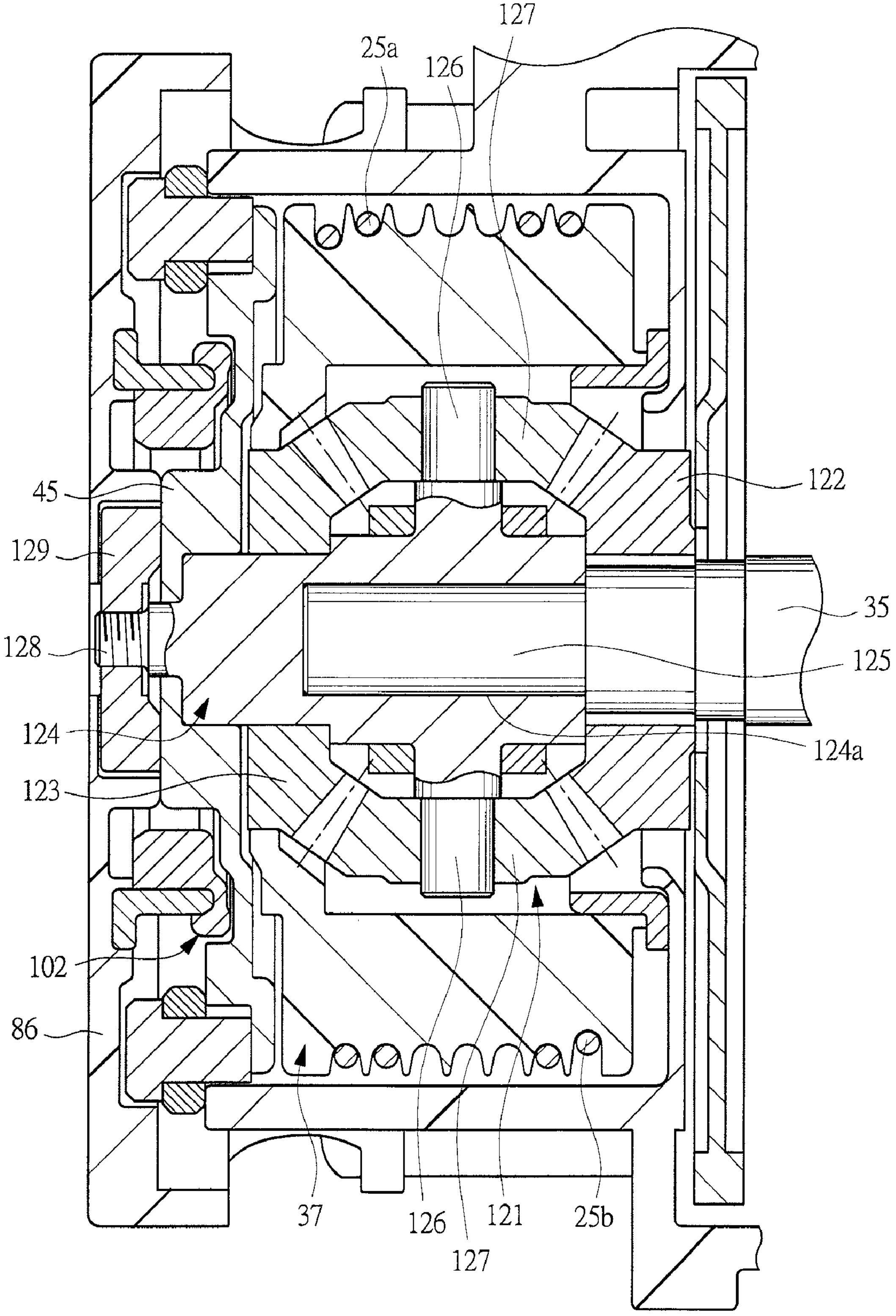
FIG. 22 is a sectional view showing a modified example in which a differential gear mechanism is used as a speed reducing mechanism instead of a planetary gear mechanism shown in FIGS. 5 and 6.
Figure 23:
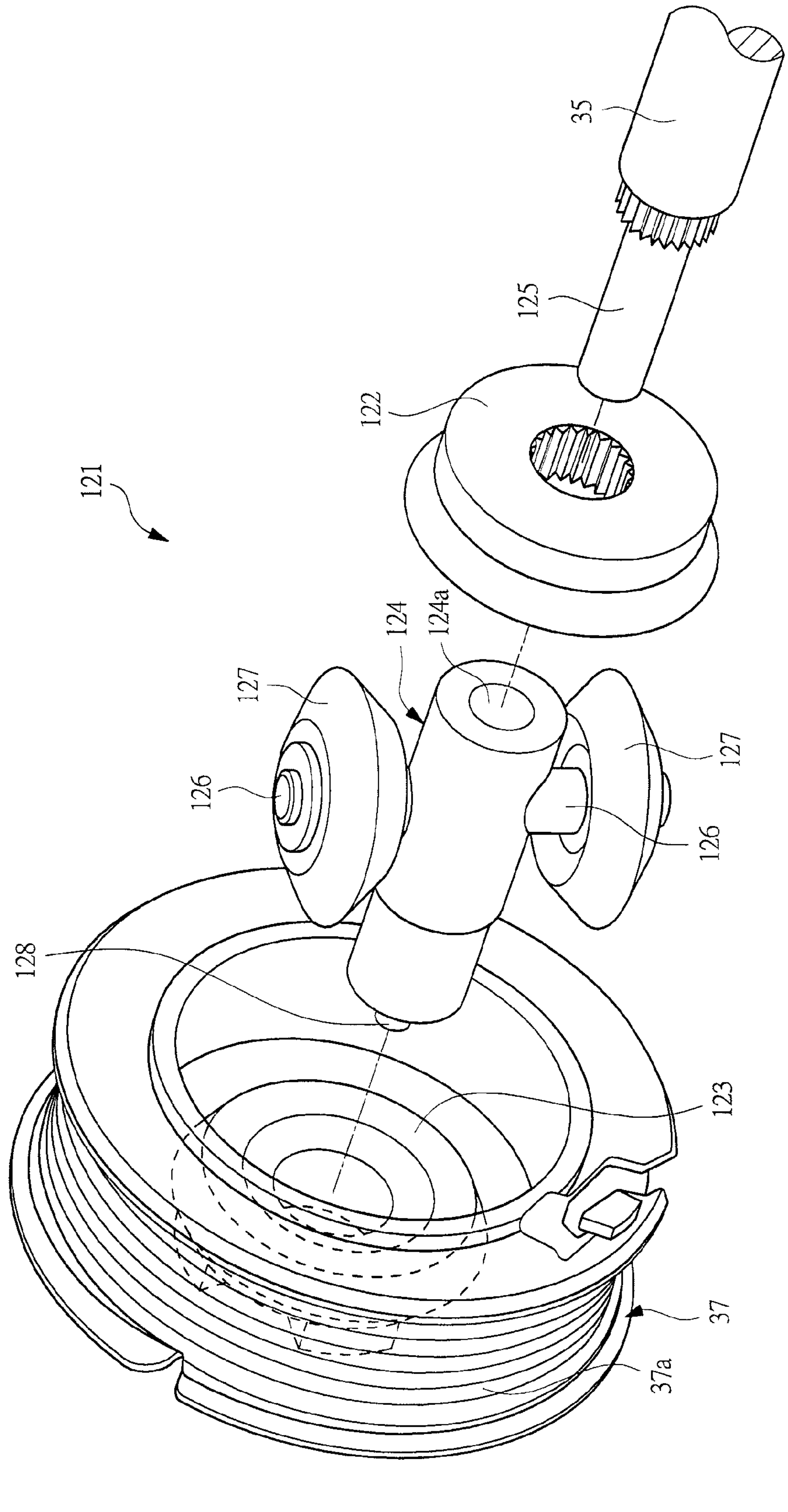
FIG. 23 is an exploded perspective view of the differential gear mechanism shown in FIG. 22.

FIG. 22 is a sectional view showing a modified example in which a differential gear mechanism is used as a speed reducing mechanism instead of the planetary gear mechanism shown in FIGS. 5 and 6, and FIG. 23 is an exploded perspective view of the differential gear mechanism shown in FIG. 22.

In the cases shown in FIGS. 5 and 6, the planetary gear mechanism 41 is used as a speed reducing mechanism for transmitting the rotation of the output shaft 35 to the drum 37. On the contrary, in the modified examples shown in FIGS. 22 and 23, a differential gear mechanism 121 is used as a speed reducing mechanism.

The differential gear mechanism 121 is provided with a drive-side bevel gear 122 as an input gear, and the drive-side bevel gear 122 is engaged with and fixed to the output shaft 35 provided with a serration, and is rotated together with the output shaft 35.

A driven-side bevel gear 123 serving as an output gear is provided on a rear side of an axial end surface of the drum 37. A base portion of the driven-side bevel gear 123 is fitted in and fixed to an inner circumferential portion of the drum 37 to be integrally rotated together with the drum 37. Further, the driven-side bevel gear 123 is disposed coaxially with the output shaft 35, and faces axially to the drive-side bevel gear 122 so that teeth portions of the both shafts oppose to each other.

A support member 124 is accommodated inside the drum 37 coaxially with the drum 37. A coupling hole 124*a* which is opened toward a side of the output shaft 35 is formed in an axis of the support member 124. On the other hand, a columnar guide portion 125 extending axially is formed integrally with a tip of the output shaft 35, and by the guide portion 125 being inserted into the coupling hole 124*a*, the support member 124 becomes in a state of being supported by the guide portion 125, thereby being coupled rotatably relatively to the output shaft 35.

An outer periphery of the support member 124 is provided integrally with a pair of support shafts 126, which are orthogonal to the output shaft 35, that is, protrude radially outward from the outer periphery, so as to be coaxial with each other and be positioned at an approximately center portion of the drum 37 in the axial direction. A side bevel gear 127 serving as a switching gear is mounted on each of the support shafts 126. The side bevel gears 127 are rotatably supported by the corresponding support shafts 126, and are arranged between the drive-side bevel gear 122 and the driven-side bevel gear 123 so as to mesh the bevel gears 122 and 123.

A tip of the support member 124 located on an opposite side to a side, on which the coupling hole 124*a* is provided, passes through the axis of the driven-side bevel gear 123 to protrude outside the drum 37; its tip portion is provided with a serration and is provided, and a small-diameter fixing thread portion 128 is provided so as to protrude from the tip portion; and the carrier 45 is fixed by engaging the carrier 45 with the serration to screw a nut 129 onto the fixing thread portion 128. In other words, the side bevel gear 127 is rotatably supported to the carrier 45 via the support member 124, thereby making it possible to rotate around the axis of the output shaft 35 together with the carrier 45. Incidentally, the driven-side bevel gear 123 is rotatable relatively to the support member 124.

In accordance with a structure mentioned above, while the slide door 14 is retained at the fully-closed position or the fully-opened position by the door-lock mechanism 51 or the full-open hook mechanism 61, the rotation of the driven-side bevel gear 123 along with the drum 37 coupled to the slide door 14 via each of the cables 25*a* and 25*b* is constrained. For this reason, when the motor with speed reducing gear 32 is actuated, the rotation of the output shaft 35, that is, the drive-side bevel gear 122 is transmitted to the releaser drive mechanism 81 via the side bevel gear 127 and the carrier 45, that is, the differential gear mechanism 121. At this time, due to a function of the differential gear mechanism 121, the rotation of the output shaft 35 is reduced one half, and its output torque becomes double to be transmitted to the releaser drive mechanism 81. Further, when an automatically closing operation of the slide door 14 is switched to the pulling operation by the closer mechanism 91, the rotation of the output shaft 35 is transmitted to the closer mechanism 91 via the differential gear mechanism 121 in the same manner. At this time, due to a function of the differential gear mechanism 121, the rotation of the output shaft 35 is reduced one half, and its output torque becomes double to be transmitted to the closer mechanism 91, whereby it is possible to make the output of the motor with speed reducing gear 32 small to such a degree. Meanwhile, when the slide door 14 is automatically opened and closed, the rotation centering on the output shaft 35 of the carrier 45, that is, the side bevel gear 127 is regulated, whereby the rotation of the output shaft 35, that is, the drive-side bevel gear 122 is transmitted to the driven-side bevel gear 123 via the side bevel gear 127, and the drum 37 is rotated. At this time, the rotation of the output shaft 35 is transmitted to the drum 37 in a one-to-one manner duet to a function of the differential gear mechanism 121.

Incidentally, in FIGS. 22 and 23, the same reference numerals are denoted to members corresponding to the members mentioned above.

Needless to say, the present invention is not limited to the embodiment mentioned above, and may be variously modified within a scope of not departing from the gist of the present invention. For example, in the embodiment mentioned above, the opening/closing apparatus 24 is a lower drive type of driving, by the cables 25*a* and 25*b*, the lower arm 15 guided by the lower rail 17. However, the present invention is not limited to this, and may be a center drive type of driving, by the cables 25*a* and 25*b*, the center arm 16 guided by the center rail 18.

Further, in the embodiment mentioned above, the open-side cable 25*a* and the close-side cable 25*b* are formed separately. However, the present invention is not limited to this, and may have a structure of winding an intermediate position of one cable around the drum 37; using one end side thereof as the open-side cable 25*a*; and using the other end side thereof as the close-side cable 25*b*.

Further, in the embodiment mentioned above, the open-state retaining mechanism retains the slide door 14 at the fully-opened position. However, the present invention is not limited to this, and may retain the slide door 14 at a predetermined open position between the fully-closed position and the fully-opened position.

Further, in the embodiment mentioned above, the door-lock mechanism 51 and the full-open hook mechanism 61 are provided on the same side as that of the slide door 14 or the vehicle body 12. However, the present invention is not limited to this, and may independently provide the both mechanisms to the slide door 14 or the vehicle body 12.

Further, in the embodiment mentioned above, the position of releasing the regulation of the rotation of the latch 53 by the switching mechanism is shown so as to be set to the position where the latch 53 reaches the half latch position, that is, the position where the ratchet 56 is engaged with the half latch groove 53*b* of the latch 53. However, the present invention is not limited to this, and may be set to a position before the latch 53 reaches the half latch position, such as a position just after the latch 53 is pushed by the striker 58 toward the full latch position direction.

Further, in the embodiment mentioned above, the coupling link 96 coupled as a toggle mechanism is used as a switching mechanism. However, the present invention is not limited to this, and the present invention may use other structures as long as the other structures are mechanisms which can regulate the rotation of the latch 53 in predetermined cases.

Further, the embodiment mentioned above is shown so that the carrier 45 and the latch 53 are coupled using the closer cable 94, and that the opening-operation drive arm 82 and the releaser lever 72, and the closing-operation drive arm 83 and the closing-operation releaser mechanism 75 are coupled using the releaser cables 74 and 75, respectively. However, the present invention is not limited to this, and as long as a mechanism is one of being actuated by synchronizing respective parts mutually, the parts may be coupled by, for example, a linking mechanism.

Further, in the embodiment mentioned above, respective wire members are constituted as the cables 25*a* and 25*b*. However, the present invention is not limited to this, and a rubber belt, wire, chain, or the like may be used as a wire member, and sprockets or the like may be used correspondingly thereto instead of the inversion pulleys 107*a* and 107*b*.

Further, in the embodiment mentioned above, the closer cable 94 is coupled to the carrier 45 via the closer drum 102. However, the present invention is not limited to this, and when each of the releaser mechanisms 71 and 75 is not provided, the closer cable 94 may be directly coupled to the carrier 45.

Further, in the embodiment mentioned above, the planetary gear mechanism 41 or the differential gear mechanism 121 is used as a speed reducing mechanism. However, the present invention is not limited to this, and may use other speed reducing mechanisms as long as they have an input gear, an output gear, and a switching gear.

Further, in the embodiment mentioned above, the planetary gear mechanism 41 or the differential gear mechanism 121 serving as a speed reducing mechanism is provided inside the drum 37. However, the present invention is not limited to this, and may be constructed so that such a mechanism is provided outside the drum 37.

Further, in the embodiment mentioned above, the input gear and the output gear are shown so as to be coaxially arranged in the speed reducing mechanism. However, the present invention is not limited to this, and the input gear and the output gear may be set as two parallel shafts according to their layout or set to two orthogonal shafts to them.

What is claimed is:

1. An opening/closing apparatus for vehicle for opening and closing a slide door provided to a vehicle by power of an electric motor, the opening/closing apparatus comprising:

a guide rail provided to one of a vehicle body and the slide door;

a support arm provided to the other of the vehicle body and the slide door, and movably supported to the guide rail;

the electric motor provided with an output shaft rotatable in both forward and backward directions, and disposed in the other of the vehicle body and the slide door;

a drive rotating body provided in the other of the vehicle body and the slide door, and rotationally driven by the electric motor;

an open-side wire member whose one end is wound around the drive rotating body, and whose other end is coupled to an open-side end of the guide rail via the support arm;

a close-side wire member whose one end is wound around the drive rotating body, and whose other end is coupled to a close-side end of the guide rail via the support arm;

a speed reducing mechanism having an input gear fixed to the output shaft, an output gear provided to the drive rotating body and rotating together with the drive rotating body, and a switching gear meshing with the input and output gears and rotatably supported to a carrier;

a latch provided in the other of the vehicle body and the slide door, and being rotatable between an unlatch position and a full latch position;

a coupling member for closure coupling the carrier and the latch, and transmitting rotation of the carrier to the latch; and a switching mechanism for regulating rotation of the latch in a full latch direction due to the rotation of the carrier when the latch is at an unlatch position, and for releasing the regulation when the latch is rotated to the full latch direction from the unlatch position, wherein when the slide door is actuated for closure so that the regulation of the rotation of the latch is released by the switching mechanism, the latch is rotationally driven in the full latch direction by the carrier so that the slide door is retracted in a fully-closed position.

2. The opening/closing apparatus for vehicle according to claim 1, wherein the input gear is a sun gear, the output gear is an internal gear formed integrally with an inner circumferential surface of the drive rotating body formed into a ring shape, and the switching gear is a planetary gear rotatably supported to the carrier by a support shaft parallel to the output shaft so as to mesh with the sun gear and the internal gear.

3. The opening/closing apparatus for vehicle according to claim 1, further comprising a rotating body for closure provided rotatably relatively to the carrier and rotated together with the carrier when the carrier is rotated a predetermined angle from a reference position, wherein the coupling member for closure is coupled to the carrier via the rotating body for closure.

4. The opening/closing apparatus for vehicle according to claim 3, wherein the rotating body for closure is always biased by biasing means in a direction of rotating the latch in the unlatch direction.

5. The opening/closing apparatus for vehicle according to claim 1, further comprising:

a ratchet retaining the latch at a full latch position; and an opening-operation releaser member whose one end is coupled to the ratchet and whose other end is engaged with an opening-operation drive portion of the carrier, the opening-operation releaser mechanism being driven by the opening-operation drive portion so as to cause the ratchet to perform a releasing operation when the carrier is rotated due to an operation of the electric motor in an opening direction.

6. The opening/closing apparatus for vehicle according to claim 2, further comprising:

a ratchet retaining the latch at a full latch position; and an opening-operation releaser member whose one end is coupled to the ratchet and whose other end is engaged with an opening-operation drive portion of the carrier, the opening-operation releaser mechanism being driven by the opening-operation drive portion so as to cause the ratchet to perform a releasing operation when the carrier is rotated due to an operation of the electric motor in an opening direction.

7. The opening/closing apparatus for vehicle according to claim 3, further comprising:

a ratchet retaining the latch at a full latch position; and an opening-operation releaser member whose one end is coupled to the ratchet and whose other end is engaged with an opening-operation drive portion of the carrier, the opening-operation releaser mechanism being driven by the opening-operation drive portion so as to cause the ratchet to perform a releasing operation when the carrier is rotated due to an operation of the electric motor in an opening direction.

8. The opening/closing apparatus for vehicle according to claim 1, further comprising:

an open-state retaining mechanism provided in the other of the vehicle body and the slide door, and engaged with an engagement member provided in the one thereof so as to retain the slide door at a predetermined open position; and a closing-operation releaser member whose one end is coupled to the open-state retaining mechanism and whose other end is engaged with a closing-operation drive portion of the carrier, the closing-operation releaser member being driven by the closing-operation drive portion so as to cause the open-state retaining mechanism to perform a releasing operation when the carrier is rotated due to an operation of the electric motor in a closing direction.

9. The opening/closing apparatus for vehicle according to claim 2, further comprising:

an open-state retaining mechanism provided in the other of the vehicle body and the slide door, and engaged with an engagement member provided in the one thereof so as to retain the slide door at a predetermined open position; and a closing-operation releaser member whose one end is coupled to the open-state retaining mechanism and whose other end is engaged with a closing-operation drive portion of the carrier, the closing-operation releaser member being driven by the closing-operation drive portion so as to cause the open-state retaining mechanism to perform a releasing operation when the carrier is rotated due to an operation of the electric motor in a closing direction.

10. The opening/closing apparatus for vehicle according to claim 3, further comprising:

an open-state retaining mechanism provided in the other of the vehicle body and the slide door, and engaged with an engagement member provided in the one thereof so as to retain the slide door at a predetermined open position; and a closing-operation releaser member whose one end is coupled to the open-state retaining mechanism and whose other end is engaged with a closing-operation drive portion of the carrier, the closing-operation releaser member being driven by the closing-operation drive portion so as to cause the open-state retaining mechanism to perform a releasing operation when the carrier is rotated due to an operation of the electric motor in a closing direction.

11. The opening/closing apparatus for vehicle according to claim 1, further comprising:

an open-state retaining mechanism provided in the one of the vehicle body and the slide door, and engaged with an engagement member provided in the other thereof so as to retain the slide door at a predetermined open position; and a closing-operation releaser member whose one end is coupled to the open-state retaining mechanism and whose other end is engaged with a closing-operation drive portion of the carrier, the closing-operation releaser member being driven by the closing-operation drive portion so as to cause the open-state retaining mechanism to perform a releasing operation when the carrier is rotated due to an operation of the electric motor in a closing direction.

12. The opening/closing apparatus for vehicle according to claim 2, further comprising:

an open-state retaining mechanism provided in the one of the vehicle body and the slide door, and engaged with an engagement member provided in the other thereof so as to retain the slide door at a predetermined open position; and a closing-operation releaser member whose one end is coupled to the open-state retaining mechanism and whose other end is engaged with a closing-operation drive portion of the carrier, the closing-operation releaser member being driven by the closing-operation drive portion so as to cause the open-state retaining mechanism to perform a releasing operation when the carrier is rotated due to an operation of the electric motor in a closing direction.

13. The opening/closing apparatus for vehicle according to claim 3, further comprising:

an open-state retaining mechanism provided in the one of the vehicle Body and the slide door, and engaged with an engagement member provided in the other thereof so as to retain the slide door at a predetermined open position; and a closing-operation releaser member whose one end is coupled to the open-state retaining mechanism and whose other end is engaged with a closing-operation drive portion of the carrier, the closing-operation releaser member being driven by the closing-operation drive portion so as to cause the open-state retaining mechanism to perform a releasing operation when the carrier is rotated due to an operation of the electric motor in a closing direction.

14. An opening/closing apparatus for vehicle for opening and closing a slide door provided to a vehicle by power of an electric motor, the opening/closing apparatus comprising:

a guide rail provided to one of a vehicle body and the slide door;

a support arm provided to the other of the vehicle body and the slide door, and being movably supported to the guide rail;

the electric motor provided with an output shaft rotatable in both forward and backward directions, and disposed in the one of the vehicle body and the slide door;

a drive rotating body provided in the one of the vehicle body and the slide door, and rotationally driven by the electric motor;

an open-side wire member whose one end is wound around the drive rotating body, and whose other end is coupled to the support arm from an open side extending along the guide rail;

a close-side wire member whose one end is wound around the drive rotating body, and whose other end is coupled to the support arm from a close side extending along the guide rail;

a speed reducing mechanism having an input gear fixed to the output shaft, an output gear provided in the drive rotating body and rotating together with the drive rotating body, and a switching gear meshing with the input and output gears and rotatably supported to a carrier;

a latch provided in the one of the vehicle body and the slide door, and being rotatable between an unlatch position and a full latch position;

a coupling member for closure coupling the carrier and the latch, and transmitting rotation of the carrier to the latch; and a switching mechanism for regulating rotation of the latch in a full latch direction due to the rotation of the carrier when the latch is at an unlatch position, and for releasing the regulation when the latch is rotated in the full latch position direction from the unlatch position, wherein when the slide door is actuated for closure so that the regulation of the rotation of the latch is released by the switching mechanism, the latch is rotationally driven in the full latch direction by the carrier so that the slide door is retracted in a fully-closed position.

15. The opening/closing apparatus for vehicle according to claim 14, wherein the input gear is a sun gear, the output gear is an internal gear formed integrally with an inner circumferential surface of the drive rotating body formed into a ring shape, and the switching gear is a planetary gear rotatably supported to the carrier by a support shaft parallel to the output shaft so as to mesh with the sun gear and the internal gear.

16. The opening/closing apparatus for vehicle according to claim 14, further comprising a rotating body for closure provided rotatably relatively to the carrier and rotated together with the carrier when the carrier is rotated a predetermined angle from a reference position, wherein the coupling member for closure is coupled to the carrier via the rotating body for closure.

17. The opening/closing apparatus for vehicle according to claim 16, wherein the rotating body for closure is always biased by biasing means in a direction of rotating the latch in the unlatch direction.

18. The opening/closing apparatus for vehicle according to claim 14, further comprising:

a ratchet retaining the latch at a full latch position; and an opening-operation releaser member whose one end is coupled to the ratchet and whose other end is engaged with an opening-operation drive portion of the carrier, the opening-operation releaser mechanism being driven by the opening-operation drive portion so as to cause the ratchet to perform a releasing operation when the carrier is rotated due to an operation of the electric motor in an opening direction.

19. The opening/closing apparatus for vehicle according to claim 15, further comprising:

a ratchet retaining the latch at a full latch position; and an opening-operation releaser member whose one end is coupled to the ratchet and whose other end is engaged with an opening-operation drive portion of the carrier, the opening-operation releaser mechanism being driven by the opening-operation drive portion so as to cause the ratchet to perform a releasing operation when the carrier is rotated due to an operation of the electric motor in an opening direction.

20. The opening/closing apparatus for vehicle according to claim 16, further comprising:

a ratchet retaining the latch at a full latch position; and an opening-operation releaser member whose one end is coupled to the ratchet and whose other end is engaged with an opening-operation drive portion of the carrier, the opening-operation releaser mechanism being driven by the opening-operation drive portion so as to cause the ratchet to perform a releasing operation when the carrier is rotated due to an operation of the electric motor in an opening direction.

21. The opening/closing apparatus for vehicle according to claim 14, further comprising:

an open-state retaining mechanism provided in the other of the vehicle body and the slide door, and engaged with an engagement member provided in the one thereof so as to retain the slide door at a predetermined open position; and a closing-operation releaser member whose one end is coupled to the open-state retaining mechanism and whose other end is engaged with a closing-operation drive portion of the carrier, the closing-operation releaser member being driven by the closing-operation drive portion so as to cause the open-state retaining mechanism to perform a releasing operation when the carrier is rotated due to an operation of the electric motor in a closing direction.

22. The opening/closing apparatus for vehicle according to claim 15, further comprising:

an open-state retaining mechanism provided in the other of the vehicle body and the slide door, and engaged with an engagement member provided in the one thereof so as to retain the slide door at a predetermined open position; and a closing-operation releaser member whose one end is coupled to the open-state retaining mechanism and whose other end is engaged with a closing-operation drive portion of the carrier, the closing-operation releaser member being driven by the closing-operation drive portion so as to cause the open-state retaining mechanism to perform a releasing operation when the carrier is rotated due to an operation of the electric motor in a closing direction.

23. The opening/closing apparatus for vehicle according to claim 16, further comprising:

an open-state retaining mechanism provided in the other of the vehicle body and the slide door, and engaged with an engagement member provided in the one thereof so as to retain the slide door at a predetermined open position; and a closing-operation releaser member whose one end is coupled to the open-state retaining mechanism and whose other end is engaged with a closing-operation drive portion of the carrier, the closing-operation releaser member being driven by the closing-operation drive portion so as to cause the open-state retaining mechanism to perform a releasing operation when the carrier is rotated due to an operation of the electric motor in a closing direction.

24. The opening/closing apparatus for vehicle according to claim 14, further comprising:

an open-state retaining mechanism provided in the one of the vehicle body and the slide door, and engaged with an engagement member provided in the other thereof so as to retain the slide door at a predetermined open position; and a closing-operation releaser member whose one end is coupled to the open-state retaining mechanism and whose other end is engaged with a closing-operation drive portion of the carrier, the closing-operation releaser member being driven by the closing-operation drive portion so as to cause the open-state retaining mechanism to perform a releasing operation when the carrier is rotated due to an operation of the electric motor in a closing direction.

25. The opening/closing apparatus for vehicle according to claim 15, further comprising:

an open-state retaining mechanism provided in the one of the vehicle body and the slide door, and engaged with an engagement member provided in the other thereof so as to retain the slide door at a predetermined open position; and a closing-operation releaser member whose one end is coupled to the open-state retaining mechanism and whose other end is engaged with a closing-operation drive portion of the carrier, the closing-operation releaser member being driven by the closing-operation drive portion so as to cause the open-state retaining mechanism to perform a releasing operation when the carrier is rotated due to an operation of the electric motor in a closing direction.

26. The opening/closing apparatus for vehicle according to claim 16, further comprising:

an open-state retaining mechanism provided in the one of the vehicle body and the slide door, and engaged with an engagement member provided in the other thereof so as to retain the slide door at a predetermined open position; and a closing-operation releaser member whose one end is coupled to the open-state retaining mechanism and whose other end is engaged with a closing-operation drive portion of the carrier, the closing-operation releaser member being driven by the closing-operation drive portion so as to cause the open-state retaining mechanism to perform a releasing operation when the carrier is rotated due to an operation of the electric motor in a closing direction.

* * * * *